US012596190B2

(12) United States Patent
Partee et al.

(10) Patent No.: US 12,596,190 B2
(45) Date of Patent: Apr. 7, 2026

(54) MILLIMETER WAVE DISPLAY ARRANGEMENT

(71) Applicant: Syght, Inc., Boulder, CO (US)

(72) Inventors: Charles Partee, Golden, CO (US); Charles Anderson, Louisville, CO (US); Tim Everett, Niwot, CO (US); Brian Magenis, Brighton, CO (US); Kevin McKinstry, Westminster, CO (US); Michael Montemorra, Berthoud, CO (US); Stephen Powell, Longmont, CO (US); Robert W. Warren, Loveland, CO (US)

(73) Assignee: SYGHT, INC., Boulder, CO (US)

( * ) Notice: Subject to any disclaimer, the term of this patent is extended or adjusted under 35 U.S.C. 154(b) by 0 days.

(21) Appl. No.: 19/071,457

(22) Filed: Mar. 5, 2025

(65) Prior Publication Data

US 2025/0200854 A1     Jun. 19, 2025

Related U.S. Application Data

(63) Continuation of application No. 19/060,453, filed on Feb. 21, 2025, which is a continuation-in-part of application No. 17/063,502, filed on Oct. 5, 2020.

(51) Int. Cl.
| | |
|---|---|
| G01S 13/90 | (2006.01) |
| G01S 7/04 | (2006.01) |
| G01S 7/06 | (2006.01) |
| G01S 7/35 | (2006.01) |
| G01S 7/40 | (2006.01) |
| G01S 13/88 | (2006.01) |
| G06T 11/60 | (2006.01) |
| H04N 23/10 | (2023.01) |

(52) U.S. Cl.
CPC ................ *G01S 13/90* (2013.01); *G01S 7/04* (2013.01); *G01S 7/06* (2013.01); *G01S 7/352* (2013.01); *G01S 7/4021* (2013.01); *G01S 13/887* (2013.01); *G06T 11/60* (2013.01); *H04N 23/10* (2023.01)

(58) Field of Classification Search
CPC ......... G06T 11/60; H04N 23/10; G01S 13/90; G01S 13/887; G01S 7/04; G01S 7/06; G01S 7/352; G01S 7/4021
USPC ....................................................... 348/143
See application file for complete search history.

(56) References Cited

U.S. PATENT DOCUMENTS

| | | | |
|---|---|---|---|
| 4,313,069 A | | 1/1982 | Szabo et al. |
| 4,661,809 A | | 4/1987 | Anderson et al. |

(Continued)

*Primary Examiner* — Joseph G Ustaris
*Assistant Examiner* — Jimmy S Lee
(74) *Attorney, Agent, or Firm* — Kenneth Altshuler

(57) ABSTRACT

A millimeter wave (MMW) display arrangement is envisioned to comprise a MMW camera that has an array of single pixel MMW detectors that capture MMWs and pipe MMW intensity data, of the captured MMWs, to a display screen where an MMW picture is assembled from a plurality of MMW sub-images from different portions of a scene scanned by the MMW camera. Each of the MMW sub-images comprise a plurality of contrast cells each of which are produced from a corresponding single pixel MMW detector. The MMW camera constructs the MMW picture by changing perspectives of the scene by way of either moving the camera or by shifting positions of a mirror between the camera and scene.

20 Claims, 28 Drawing Sheets

(56)  References Cited

U.S. PATENT DOCUMENTS

| | | | |
|---|---|---|---|
| 6,262,574 B1 | 7/2001 | Cho et al. | |
| 7,912,527 B2 * | 3/2011 | Robertson | A61B 5/01 |
| | | | 250/339.04 |
| 9,466,109 B1 * | 10/2016 | Adsumilli | G06T 7/30 |
| 9,497,380 B1 * | 11/2016 | Jannard | H04N 23/90 |
| 10,345,631 B1 | 7/2019 | Partee et al. | |
| 2006/0085160 A1 | 4/2006 | Ouchi | |
| 2007/0235652 A1 | 10/2007 | Smith | |
| 2008/0100510 A1 | 5/2008 | Bonthron et al. | |
| 2008/0129581 A1 | 6/2008 | Douglass et al. | |
| 2009/0041293 A1 * | 2/2009 | Andrew | H04N 5/272 |
| | | | 348/262 |
| 2009/0060272 A1 * | 3/2009 | Reinpoldt, III | G06T 11/60 |
| | | | 382/103 |
| 2012/0026336 A1 | 2/2012 | Koren et al. | |
| 2012/0182178 A1 | 7/2012 | Pesetski et al. | |
| 2012/0288137 A1 | 11/2012 | Daly et al. | |
| 2016/0223588 A1 * | 8/2016 | Fox | G01R 31/58 |
| 2018/0038735 A1 * | 2/2018 | Chien | G01J 5/026 |
| 2020/0225321 A1 | 7/2020 | Kruglick et al. | |
| 2020/0249341 A1 | 8/2020 | Valdes Garcia et al. | |

* cited by examiner

150

119          154                                    150

119

154

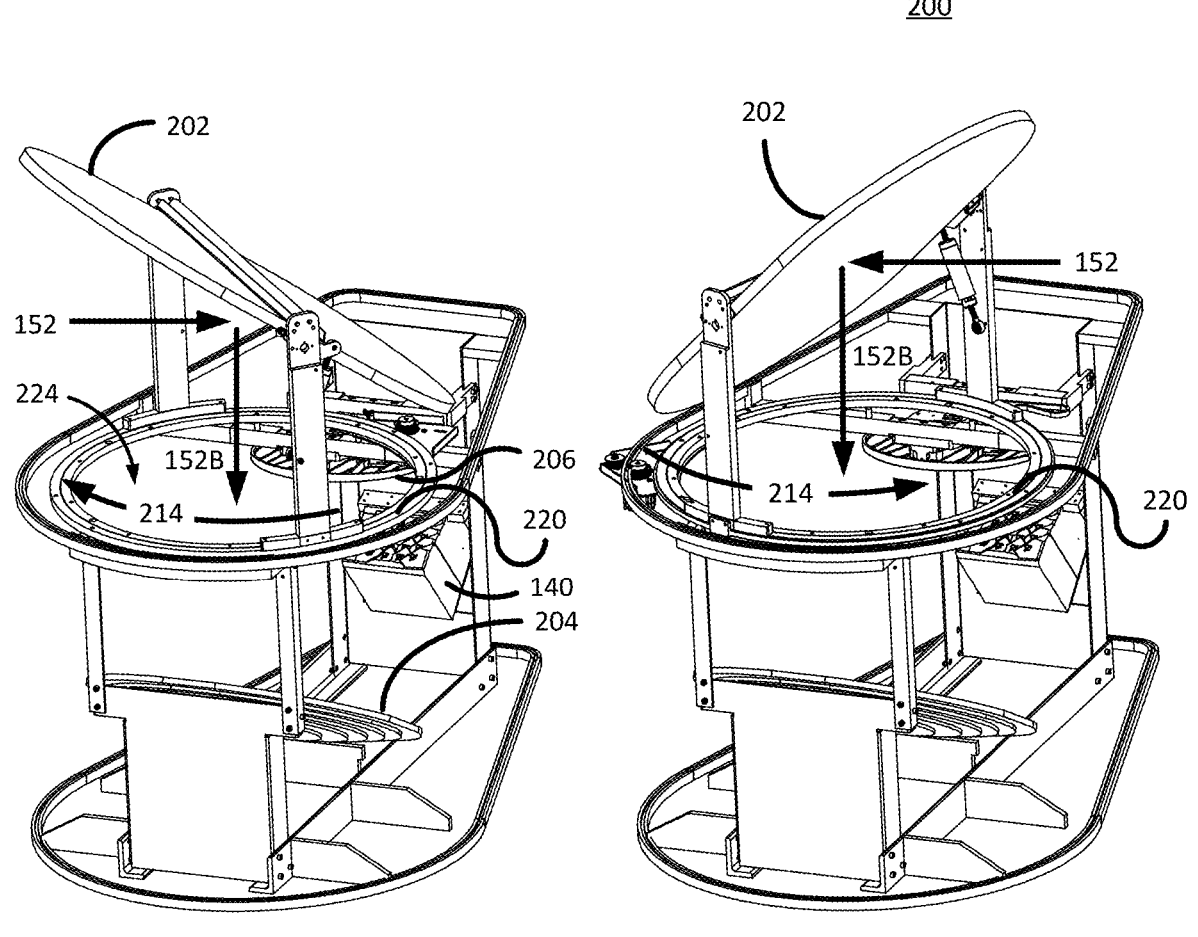
FIG. 2D            FIG. 2E

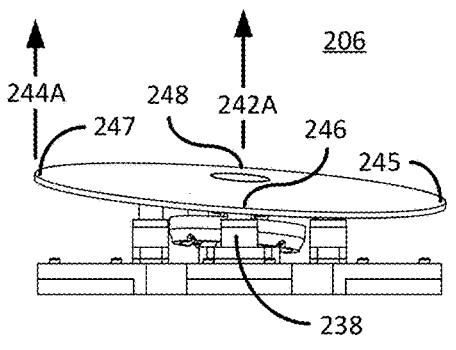
FIG. 3C
FIG. 3D
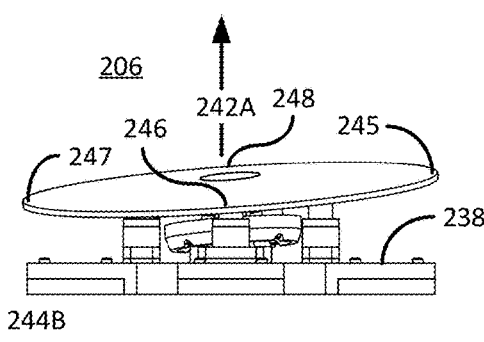
FIG. 3E
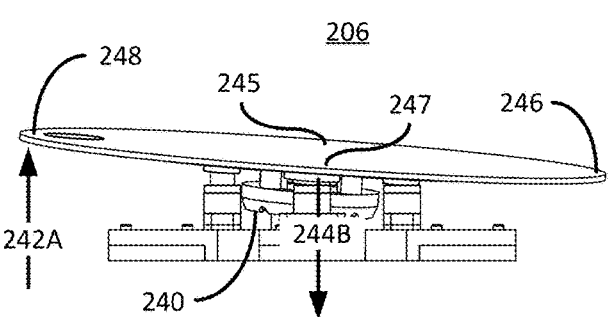
FIG. 3F

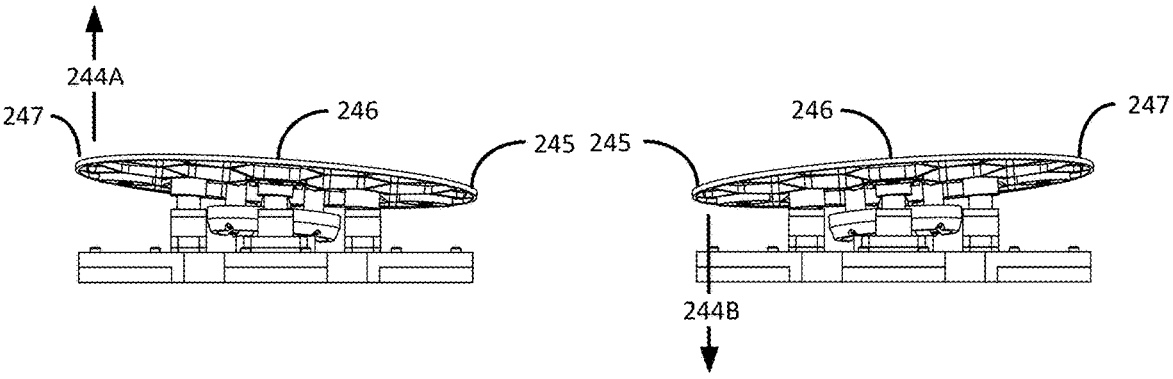
FIG. 3G
FIG. 3H
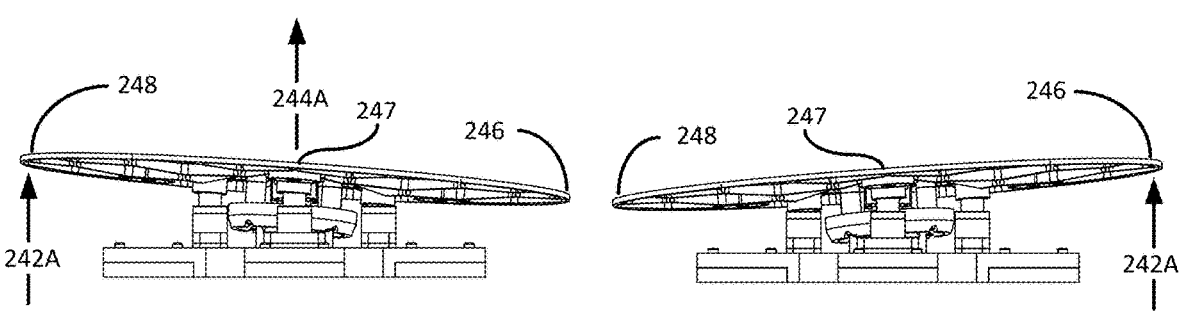
FIG. 3I
FIG. 3J

310

305                    315

314                              318

316

320

331     332     333     334     335     336     337     338

322                                                              119

154A                              154B

340

MILLIMETER WAVE DISPLAY ARRANGEMENT

CROSS-REFERENCE TO RELATED APPLICATIONS

This continuation application which claims priority to and the benefit of U.S. patent application Ser. No. 19/060,453 entitled Millimeter Wavelength Camera Arrangement, filed on Feb. 21, 2025, which is a continuation-in-part application claiming priority to and the benefit of U.S. patent application Ser. No. 17/063,502 entitled Combination Optical and Millimeter Wavelength Camera, filed on Oct. 5, 2020, the entire disclosure of which is hereby incorporated by reference.

FIELD OF THE INVENTION

The present embodiments are directed to a millimeter wavelength camera arrangement.

DESCRIPTION OF RELATED ART

Whether for protection or outright assault, people have been concealing weapons since before recorded history. Accordingly, personal examinations for security have existed just short of when concealed weapons were first conceived. With today's explosion of technology advances, the range of weapon options is expansive. From bombs and hand grenades to guns and knives, routine pat-downs can be a dangerous proposition for security personnel. Considering modern-day social sensitivities, the intimate touch of a pat-down is not looked upon favorably. Armed with this understanding, it should be obvious that innovations around pat-downs, such as metal detectors, active millimeter wave systems, and x-ray systems, are being actively used to help reveal and thwart unwanted entrance of concealed weapons in secure locations without invasion of personal space. In fact, use of metal detectors, active millimeter wave, and x-ray systems are ubiquitous in airports, government buildings, hospitals, etc. Though reasonably effective, these detectors need to be within a couple of feet from the subject being scanned for any hope of obtaining a signal strong enough to adequately detect a concealed weapon. Active millimeter wave systems only work when the subject is a known, and short, distance away. In the case of x-rays, undesirable health impact has been shown. Most metal detectors, active millimeter wave, and x-ray systems are large stationary pieces of equipment that a person must walk to or through.

Hand-held metal detectors (often shaped like wands with the sensor at one end and the handle at the other) in particular require close proximity to the subject of interest in order to detect items of interest. Further, only one person at a time can be scanned with these devices. One of the most utilized hand-held detectors that can detect metal is a wand that operates 6 inches from the person and is marketed as a long-distance metal detector.

It is to innovations related to this subject matter that the claimed invention is generally directed.

SUMMARY OF THE INVENTION

The present embodiments are directed to hand-held or stand-alone, either fixed or portable, millimeter wavelength and digital cameras, which include optical, IR, LIDAR, night vision, etc., which can generate digital images.

Certain embodiments of the present invention contemplate a millimeter wave (MMW) detector arrangement comprising a MMW camera made up of a matrix of single pixel MMW detectors that each comprise a MMW receiving aperture, a MMW analog to digital converter, and a digital output channel. The MMW receiving aperture is configured to receive MMWs emitted from a target. The MMW analog to digital converter is configured to convert the MMWs received from the MMW receiving aperture into a digital intensity value. The digital output channel is configured to transmit a digital signal corresponding to the digital intensity value. An armature supports and positions the matrix with the MMW receiving apertures of the detectors essentially defining a three-dimensional (3-D) convex curve.

Another embodiment of the present invention contemplates a MMW detector system is a MMW camera that comprises a plurality of single pixel MMW detectors arranged in a matrix, each of single pixel MMW detectors comprising a MMW receiving aperture, a MMW analog to digital converter, and a digital output channel. The MMW receiving aperture is configured to receive MMW waves. The MMW analog to digital (A to D) converter is configured to convert the MMW waves that are received from the MMW receiving aperture into a digital intensity value. The digital output channel is configured to transmit a digital signal corresponding to the digital intensity value. The plurality of single pixel MMW detectors are positioned with, or otherwise having, each of the MMW receiving apertures disposed along a three-dimensional (3-D) convex curve.

Yet another embodiment of the present invention contemplates a detector device (MMW camera) comprising an array of single pixel MMW receivers each having a MMW receiving aperture, a MMW analog to digital converter, and a digital output channel. Each of the detectors is envisioned to have a line-of-sight extending from each of the MMW receiving apertures. The array is arranged wherein the detector lines-of-sight are all angled towards one another. Each of the MMW receiving aperture is configured to receive MMW waves. Each of the MMW analog to digital converters is configured to convert the MMW waves received from a corresponding one of the MMW receiving apertures into a digital intensity value. Each of the digital output channels is configured to transmit a digital signal corresponding to the digital intensity value.

Another embodiment of the present invention contemplates a MMW detector arrangement that comprises an oscillating mirror positioned between a MMW camera and a target. The MMW camera comprises an array of MMW detectors and is configured to output first MMW sub-image data and second MMW sub-image data. The MMW detector arrangement further comprises a display screen that displays a first MMW sub-image and a second MMW sub-image wherein the first MMW sub-image corresponding to the first MMW sub-image data and a second MMW sub-image corresponding to the second MMW sub-image data. Each of the sub-images comprises a plurality of MMW contrast cells each of which correspond to one of the MMW detectors in the MMW camera. The first MMW sub-image corresponds to the oscillating mirror being in a first position, the second MMW sub-image corresponding to the oscillating mirror being in a second position.

Still another embodiment of the present invention contemplates a MMW camera arrangement comprising a repositionable mirror positioned between a MMW camera and a target. The MMW camera is configured to collect MMW waves from the target that are redirected (to the MMW camera) via the repositionable mirror. The MMW camera arrangement further comprises a display screen comprising or otherwise displaying a MMW picture. The MMW picture comprising a first MMW sub-image obtained from the MMW camera while the repositionable mirror was in a first position and a second MMW sub-image obtained from the MMW camera while the repositionable mirror was in a second position.

While still another embodiment of the present invention contemplates a MMW camera arrangement that generally comprises a MMW camera having a line-of-sight directed at an oscillating mirror, wherein the oscillating mirror is configured to redirect MMWs received from a target to the MMW camera. A display screen configured to display a MMW picture, wherein the MMW picture comprises a first MMW sub-image obtained from the MMW camera while the oscillating mirror is in a first position and a second MMW sub-image obtained from the MMW camera while the oscillating mirror is in a second position.

Yet other embodiments of the present invention contemplate a detector arrangement comprising a multi-positional mirror interposed between a statically mounted MMW camera and a target, wherein the MMW camera comprises a matrix of single pixel MMW detectors each of which comprise a MMW receiving aperture, an analog to digital converter, and a digital output channel. The matrix is configured to receive MMWs from a target field-of-view. The MMWs are reflected off the multi-positional mirror. The target field-of-view defined in size by how many of the single pixel MMW detectors comprise the matrix. The target field-of-view corresponds to a single MMW sub-image viewable from a display screen. A MMW picture, viewable from a display screen, is comprised of a plurality of the MMW sub-images successively stitched together (meaning that a first MMW sub-image is obtained before a second MMW sub-image and so forth). Each of the MMW sub-images correspond to a different view of the target. Each of the different views correspond to a different position of the multi-positional mirror.

Other embodiments of the present invention contemplate a MMW display arrangement comprising a MMW camera coupled to (electrically connected to transmit data thereto) a display screen. The MMW camera comprises an array of single pixel MMW detectors. The display screen comprises a first MMW sub-image that is joined to a second MMW sub-image. Each of the MMW sub-images comprises a plurality of contrast cells, each of which are produced from a corresponding one of the single pixel MMW detectors. Each of the single pixel MMW detectors is configured to detect MMWs from a different portion of a target and convert the detected MMWs into digital contrast cell data displayed as the contrast cell. The first MMW sub-image is obtained before the second MMW sub-image and the first MMW sub-image is from a different part of the target than the second MMW sub-image.

Yet another embodiment of the present invention contemplates a MMW capture and display arrangement displayed on a display screen that depicts a first MMW sub-image joined to a second MMW sub-image. The first MMW sub-image comprises a first matrix of first contrast cells and the second MMW sub-image comprises a second matrix of second contrast cells. A MMW camera is connected to the display screen, wherein the MMW camera comprising an array of single pixel MMW detectors. Each of the single pixel MMW detectors is configured to receive MMWs from a scene and convert the MMWs into contrast cell data corresponding to the contrast cells. The first MMW sub-image is from a first portion of the scene, which is obtained before the second MMW sub-image. The second MMW sub-image is from a second portion of the scene.

Another embodiment of the present invention contemplates a method for stitching together MMW sub-images. The method comprises a step for providing a MMW camera comprising an array of single pixel MMW detectors; a step for receiving first MMWs from a first portion of a scene via the MMW camera; a step for converting the first MMWs into a first digital MMW sub-image, wherein the first digital MMW sub-image comprises a plurality of digitized MMW cells each corresponding to one of the single pixel MMW detectors; a step for transmitting the first digital MMW sub-image to a display screen; a step for receiving second MMWs from a second portion of a scene via the MMW camera after receiving the first portion; a step for transmitting a second digital MMW sub-image of the second MMWs to the display screen; and a step for displaying the first and the second digital MMW sub-images as first and second MMW sub-images and that are joined, the first and second MMW sub-images and comprise a plurality of contrast cells each corresponding to the plurality of digitized MMW cells.

Another embodiment of the present invention contemplates a MMW scene defining arrangement generally comprising a MMW camera with an adjustable a receiving mirror connected to a turret. This embodiment envisions an oscillating mirror interposed between a static reflecting mirror and the MMW camera. A receiving mirror, which is view adjusting and therefore configured to redirect MMWs from a scene to the static reflecting mirror. The receiving mirror cooperates (that is, attached either directly via pivot points or via an intermediate element, such as the bar) with a frame in a pivoting relationship, wherein the receiving mirror is configured to tilt changing a vertical perspective of the scene. The static reflecting mirror is configured to redirect the MMWs from the receiving mirror to the oscillating mirror, the oscillating mirror is configured to redirect the MMWs to the MMW camera.

Yet another embodiment of the present invention envisions a scene adjustable MMW arrangement that generally comprises a MMW camera with an adjustable a receiving mirror connected to a turret. The MMW camera is configured to detect MMWs indirectly from a portion of a scene. The arrangement further includes an oscillating mirror between a static reflecting mirror and the MMW camera and a receiving mirror between the static reflecting mirror and the scene. When in a first position, the receiving mirror is configured to redirect the MMWs from a first part of the scene to the static reflecting mirror, which is configured to redirect the MMWs to the oscillating mirror, which is configured to redirect the MMWs to the MMW camera. When in a second position, the receiving mirror is configured to redirect the MMWs from a second part of the scene to the MMW camera via the static reflecting mirror and the oscillating mirror, wherein the first part is in a different vertical portion of the scene than the second part.

Still yet another embodiment envisions a scene adjustable method for a MMW camera, wherein the method can comprise a plurality of steps to use the scene adjustable MMW arrangement. The method can include a step for providing a scene adjustable MMW arrangement comprising a MMW camera, a receiving mirror, a static reflecting mirror and an oscillating mirror, wherein the mirrors, and are between a scene and the MMW camera. The method can further include a step for adjusting the receiving mirror in a first position to redirect MMWs from a first vertical region of the scene to the MMW camera via the static reflecting mirror and the oscillating mirror; capturing a first MMW picture of a first MMW perimeter corresponding to the first vertical region; readjusting the receiving mirror in a second position to redirect MMWs from a second vertical region of the scene to the MMW camera; and capturing a second MMW picture of a second MMW perimeter corresponding to the second vertical region.

BRIEF DESCRIPTION OF THE DRAWINGS

FIGS. 2A-2E are line drawings that illustratively depict a MMW camera system consistent with embodiments of the present invention;

FIGS. 3A-3J illustratively depict the motion of the oscillating mirror consistent with embodiments of the present invention;

DETAILED DESCRIPTION

Figure 1A:
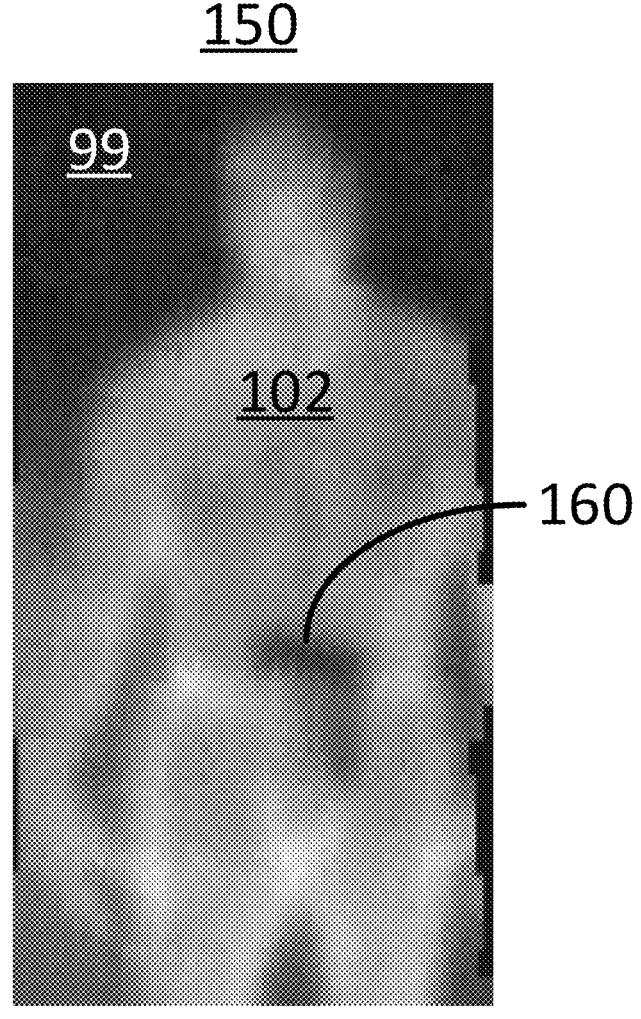
FIG. 1A is a black and white pixelated depiction of a MMW picture consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phrases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/– value assigned to "essentially", then assume essentially means to be within +/–2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical call-outs.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments of a millimeter wave (MMW) display arrangement is envisioned to comprise a MMW camera that has an array of single pixel MMW detectors that capture MMWs and pipe MMW intensity data, of the captured MMWs, to a display screen where a MMW picture is assembled from a plurality of MMW sub-images from different portions of a scene scanned by the MMW camera. Each of the MMW sub-images comprise a plurality of contrast cells each of which are produced from a corresponding single pixel MMW detector. The MMW camera constructs the MMW picture by changing perspectives of the scene by way of either moving the camera or by shifting positions of a mirror between the camera and scene.

Other embodiments are of a MMW camera device that can be a combination of one or more digital optical cameras and MMW cameras. In certain embodiments the MMW camera can be constrained in a static position while relying on an actuating mirror to provide the MMW camera with varied points of view of a target image that is too large for a single MMW image frame, or a sub-image as used herein. The digital optical camera or cameras is/are configured to take digital images of a particular scene in the optical camera field-of-view and transfer the digital image/s to non-transitory memory in the camera device. Certain embodiments envision the digital optical camera, or cameras, being able to take images in an optical radiation range defined as including ultraviolet (UV), light, and infrared (IR) where one camera may be more suitable for a given optical radiation range and the additional cameras may be more suited for a different optical radiation range within the range specified herein. Hence, the optical radiation range as used herein essentially ranges from 100 nm to 1 mm, or spanning the lower limits of UV to the upper limits of IR. Certain embodiments of the present invention envision substituting the digital optical camera for cameras using different detecting techniques, such as LIDAR, night vision, etc., which can all generate digital images without departing from the scope and spirit of the present invention. It should also be appreciated that the use of an optical camera that strictly takes images within the light spectrum, or some variant thereof, is likewise considered an optical camera within the scope of the present invention. In contrast to a digital optical camera, the MMW camera detects frequencies essentially between 30-300 GHz making the MMW camera especially good at seeing objects of varied composition, such as metal, ceramic, plastics, liquids, under garments, such as concealed weapons on a person or in a bag, box, bin or some other carrier. The MMW camera can be arranged to point in the same field-of-view as the optical camera so that when a MMW picture is taken it is automatically framed within the optical camera field-of-view. In certain configurations, the MMW camera takes a plurality of MMW sub-images defined within a MMW field-of-view. In the case where the MMW field-of-view is smaller than the optical camera field-of-view, the multiple MMW sub-images can be stitched together and overlaid on the optical image of the same scene to show an object superimposed over a subject of interest, such as a person potentially carrying a concealed weapon or a weapon in a bag.

In general, MMW energy penetrates clothing and bags but partially reflects off humans, plastics, ceramics, and nearly perfectly reflects off metals. MMWs are non-ionizing (unlike X-Rays, for example) and is therefore safe for humans. Certain embodiments described below use only the energy already present in the environment and emitted from the objects in a target scene. It does not emit radiation of its own from a MMW source. As exemplified in Table 1, all materials have a different emissivity $\varepsilon$, reflectivity $\rho$, and transmissivity $\tau$, such that:

$$\varepsilon + \rho + \tau = 1$$

TABLE 1

|  | Emissivity $\varepsilon$ | Reflectivity $\rho$ | Transmissivity $\tau$ | temperature |
|---|---|---|---|---|
| Clothing | 0.10 | 0 | 0.90 | 30 C. |
| Person | 0.60 | 0.40 | 0 | 37 C. |
| Metal | 0.01 | .99 | 0 | 22 C. |
| Isolated gun | 0.15 | 0.85 | 0 | 22 C. |
| Gun touching person | 0.15 | 0.85 | 0 | 33 C. |
| Plastic explosive | 0.40 | 0.60 | 0 | 33 C. |

Certain embodiments below measure the apparent temperature of each object detected in a scene, such as in accordance with the equation:

$$Tapp = \varepsilon * Temit + \rho * Trefl + \tau * Ttrans$$

Hence, for example, as shown by the MMW picture 150 of FIG. 1A, a gun 160 emits 15% at its temperature (midway between the gun holder's body 200 and the room), reflects 85% of the room temperature. No transmission. Therefore, $$\text{Gun: } Tapp = 0.15 * 33° \text{ C.} + 0.85 * 22° \text{ C.} + 0 * 37° \text{ C.} = 23.7° \text{ C.}$$

The person, on the other hand, emits 60% at body temperature and reflects 40% of the room temperature. No transmission.

$$\text{Person: } Tapp = 0.6 * 37° \text{ C.} + 0.4 * 22° \text{ C.} + 0 * 22° \text{ C.} = 31.0° \text{ C.}$$

Accordingly, even if the gun is at body temperature, the delta apparent temperature is still >6 degrees. The apparent temperature is the sum of the emissions from the object, the reflections off the object, and any energy that is coming through the object (this last term is usually 0).

Figure 1B:
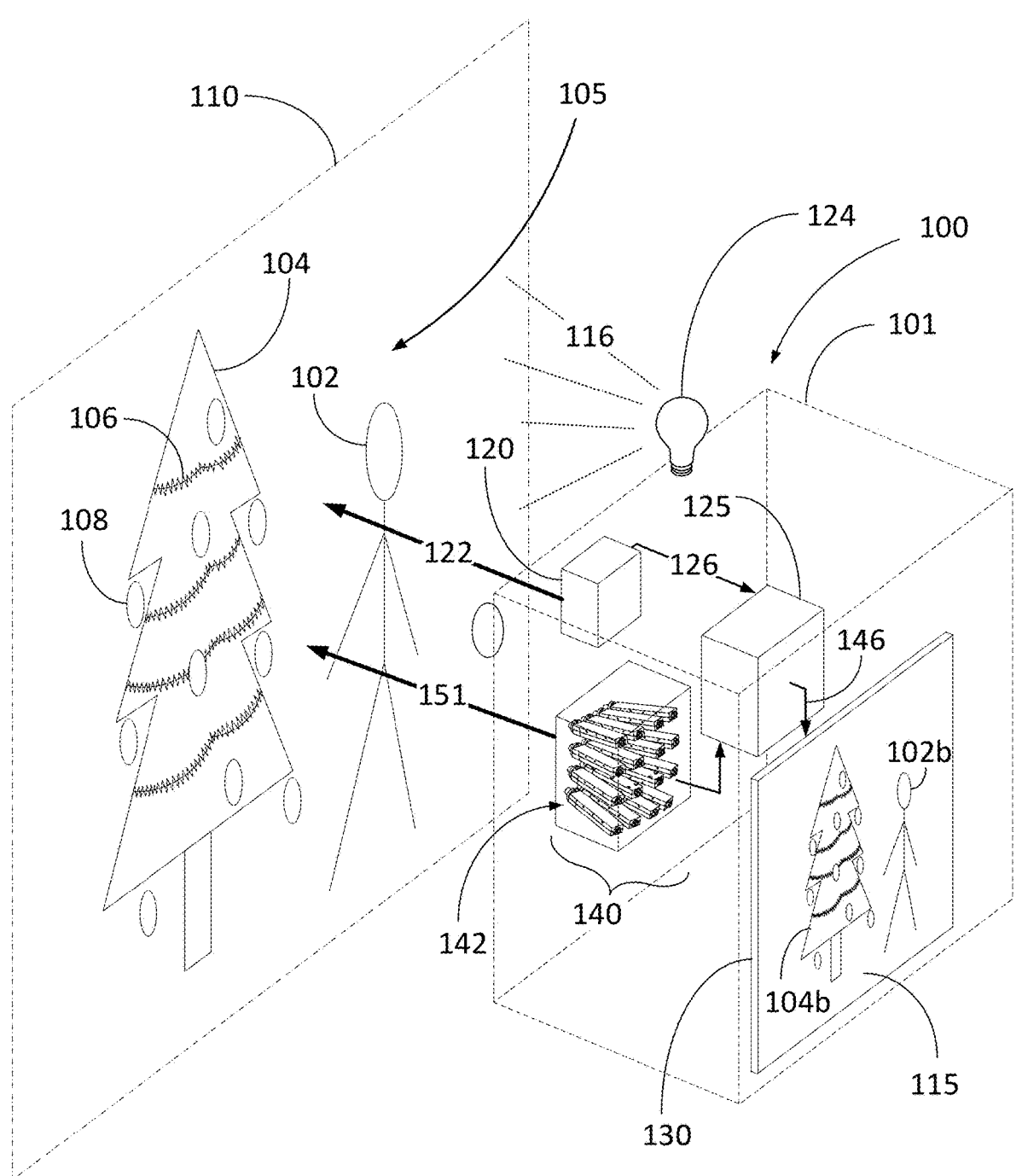
FIGS. 1B-1D are block diagrams of a MMW and optic camera arrangement consistent with embodiments of the present invention.
Figure 1C:
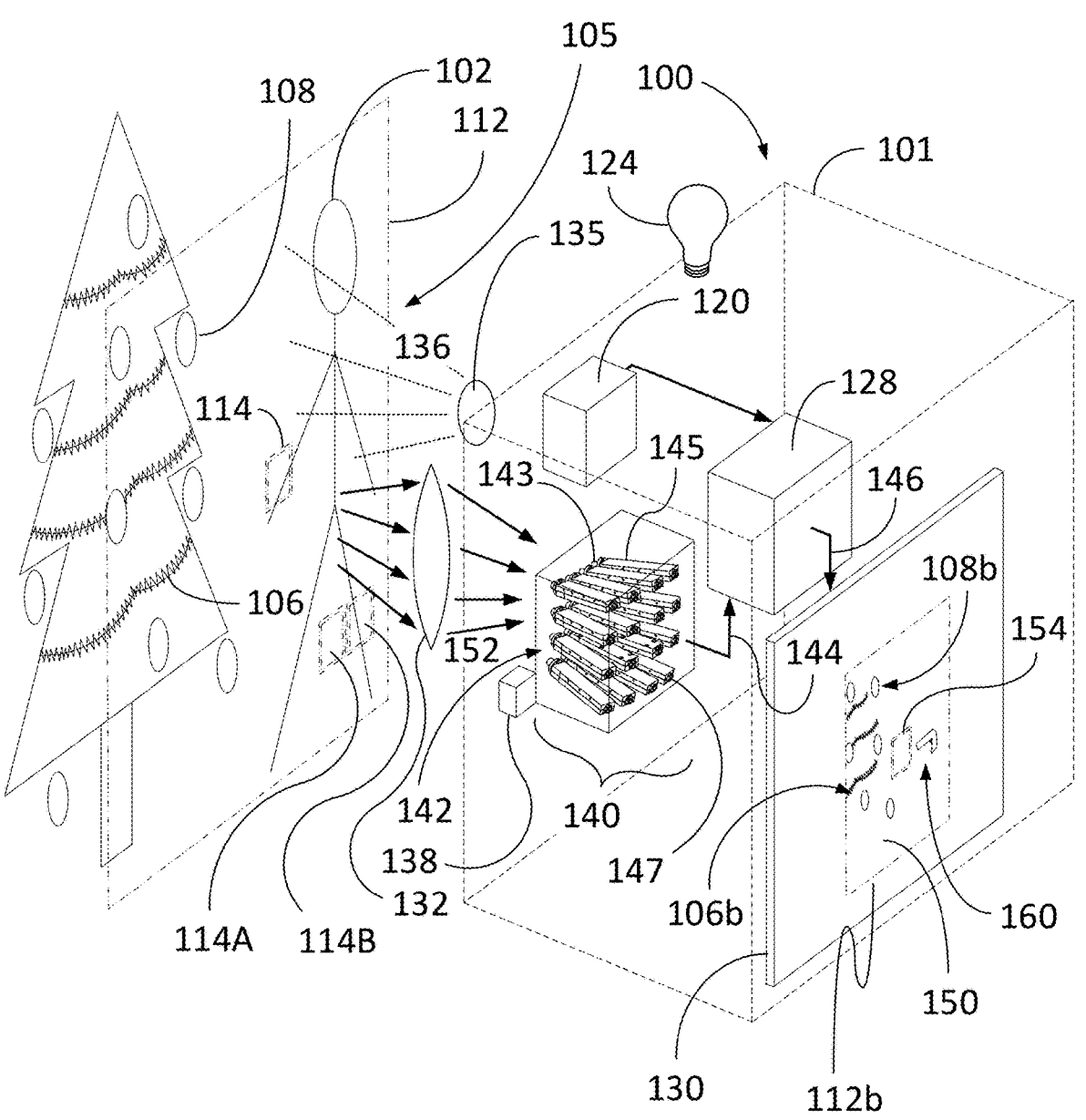
Figure 1D:
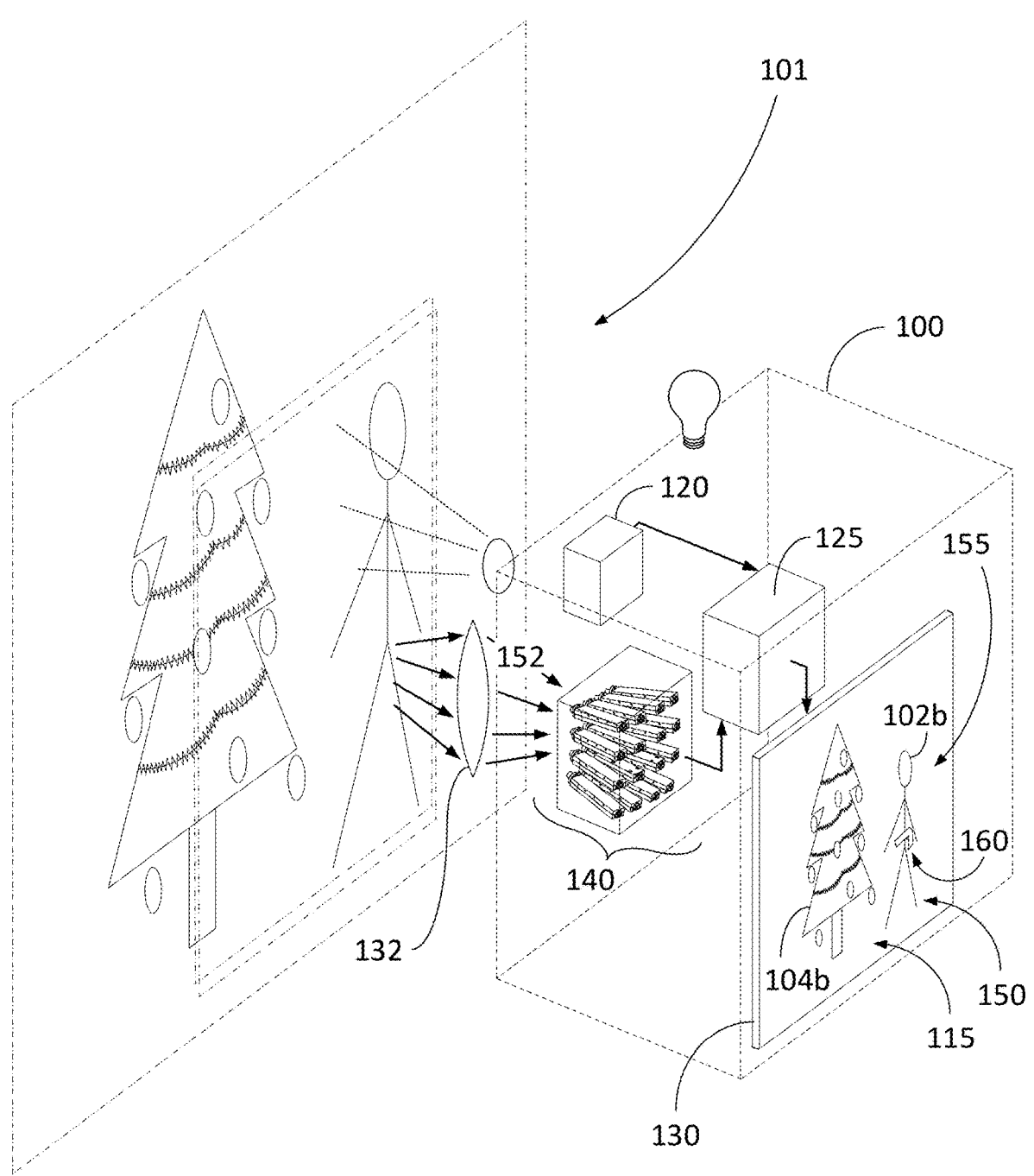

FIGS. 1B-1D are block diagrams of a MMW and optic camera arrangement, which is configured to capture an optical image of a scene and display the optical image as an optical picture overlayed with a MMW picture. The MMW and optic camera arrangement 100, or simply camera arrangement, is consistent with embodiments of the present invention.

FIG. 1B is a line drawing of a scene 105 being viewed by a camera arrangement 100 that includes an optical camera system, or simply "optical camera", and a MMW camera system, or simply "MMW camera". FIG. 1B depicts the optical camera 120 obtaining a digital optical photo of the scene 105 and displaying the digital optical photo as an optical picture 115 displayed on the display screen 130. More specifically, the optical camera 120 is pointing towards a scene 105 comprising a person 102 (target) and Christmas tree 104 decorated with shiny metallic Christmas balls 108 and garland 106. The scene 105 could just as easily include a bag, such as a duffel bag, as the subject matter containing or suspected of containing a concealed weapon with or without a human being present. The digital optical camera 120, which is well understood in the art and therefore the mechanics of which will not be discussed herein, has a line-of-sight 122 pointed towards the scene 105. The optical camera 120 is arranged to take an optical photo within the boundary of an optical camera field-of-view 110, depicted by the dashed-dotted rectangular line surrounding the scene 105. Field-of-view used herein means the picture size that the optical camera 120 can take in a single frame (i.e., not in a video). The digital optical photo taken by the optical camera 120 is transferred to the computing system 125 via an optical camera-to-computer connection 126, where the digital photo is processed. The computer system 125 transfers the processed digital photo to a display screen 130 via a computer-to-display connection 146. As shown, the optical picture 115 of the person 102b and the Christmas tree 104b are rendered on the display screen 130. Certain commercial embodiments envision the display screen 130 being an LCD (liquid crystal display) or LED (light emitting diode) display screen, however a multitude of different kinds of screens can be equally used without departing from the scope and spirit of the present invention. Equally, the picture could be stored as a file or transmitted to an image analysis program without actually being displayed, without departing from the scope and spirit of the present invention. A light source 124 can further be integrated with the optical camera 120 to illuminate the scene 105 if it is insufficiently lit. Certain embodiments envision the light source 124 emitting light 116 in the visible range while other embodiments envision the light source 124 emitting light in a range outside the visible range (such as infrared and/or ultraviolet), wherein the optical camera 120 is capable of detecting images in the chosen light spectrum.

The camera arrangement 100 further includes a MMW camera 140, comprising a MMW camera detector array 142 (or matrix), which is also connected to the computing system 125. The MMW camera 140 is pointing at the scene 105 within the optical camera field-of-view 110, wherein in certain embodiments, the MMW camera's line-of-sight 151 can coincide with the optical camera line-of-sight 122. When the MMW camera 140 is pointing in the optical camera line-of-sight 122, it is envisioned to mean being parallel to the optical camera line-of-sight 122 and/or at least within the optical camera field-of-view 110. As shown in this embodiment, the MMW camera 140, the optical camera 120 and computing system 125 are essentially enclosed in a camera housing 101, with lenses 132, lights, apertures, the display screen 130 and other elements partially protruding or extending from the camera housing 101. It should be appreciated that the elements shown in or on the camera housing 101 could be interconnected within the housing 101 or independent of the housing 101, such as the display screen 130 being connected but remote to the computer system 125, for example.

FIG. 1C is a line drawing of the scene 101 being viewed solely by the MMW camera 140 consistent with embodiments of the present invention. The MMW camera 140 is adept at imaging and is being used in this depiction to screen the person 102 (target) for a concealed weapon, or other metallic object. A MMW picture 150, made up of multiple MMW sub-images 154, is displayed on the display screen 130. A portion of the Christmas tree 104 revealing the metallic Christmas balls 108*b* and the metallic garland 106*b* is depicted within the MMW picture 150. Here, the MMW perimeter 112 (which could be considered the perimeter of interest) is depicted by a double dotted dashed line. Certain embodiments contemplate the MMW field-of-view 114 being defined within the MMW perimeter 112, which in certain embodiments is smaller than the MMW perimeter 112. In this embodiment, the MMW field-of-view 114 is a portion of the MMW perimeter 112, that is a plurality of MMW sub-images 154 in the form of rows and columns make up the MMW picture 150 and therefore defined the MMW perimeter 112. A MMW field-of-view 114 as used herein defines the MMW sub-image size 154. The MMW sub-image size 154, in turn, is defined by the number of individual MMW detectors 145 in the MMW camera detector array 142. Because the MMW field-of-view 114 is a fraction of the MMW perimeter 112 size, this embodiment contemplates the MMW camera 140 being moved either manually or by a MMW camera motor 138, depicted as a block connected to the MMW camera 140. The MMW camera motor 138 is envisioned to move the MMW camera 140 in both the X and Y directions to capture an array of MMW fields-of-view, such as a first MMW field-of-view 114A and a second MMW field-of-view 114B, and so on, which are then used to successively construct the MMW picture 150 by way of stitching together a plurality/array of MMW sub-images 154 (in rows and column, as shown in FIG. 6B, for example). The MMW sub-images 154 may or may not be successively constructed on the display 130 but the MMW sub-image data sent by the MMW camera 140 to the computer 125 is assembled successively into the MMW picture data in the computer 125, which will be displayed as a MMW picture 150 on the display screen 130. It should be clear that a first MMW snapshot (MMW sub-image data) of a first field-of-view 114A is taken before a second MMW snap-shot of a second field-of-view 114B is taken. Each MMW sub-image data (snapshot) from each field-of-view (114A then 114B) is sent or otherwise transmitted successively (one after the next) to a processor (either in the computer 125 or in the MMW camera 140 or somewhere cooperating with the computer 125 and/or MMW camera 140) to be assembled or otherwise stitched together. In an optional embodiment, the MMW data and/or optical data can be sent to a file or AI engine for detecting weapons, or just an alarm instead of being sent to a digital display screen 130.

Figure 1E:
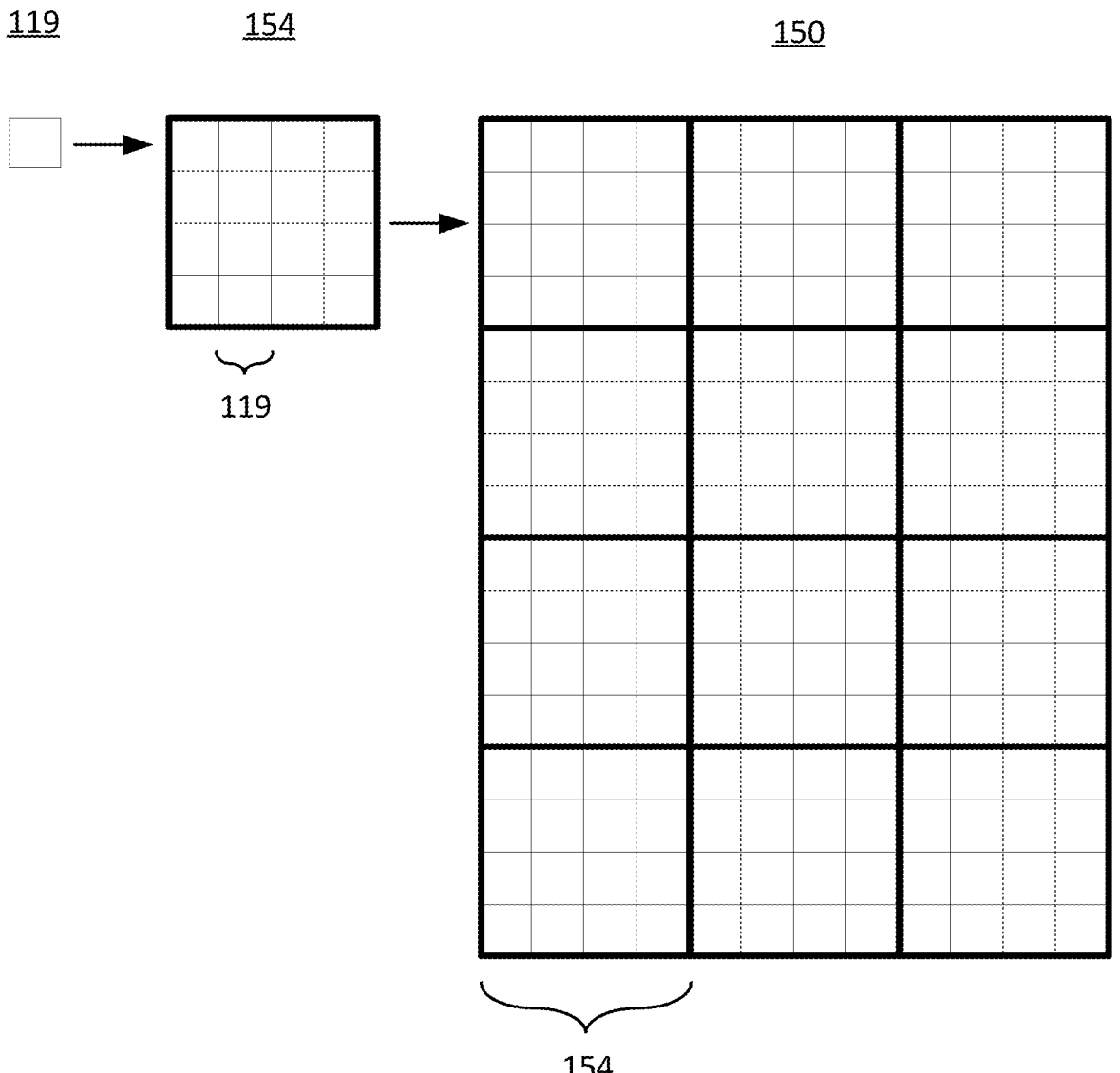
FIG. 1E illustratively depicts the relationship between a MMW contrast cell, a MMW sub-image and a MMW picture.

As discussed in conjunction with FIG. 1E, there are 16 MMW contrast cells 119 in one MMW sub-image 154, wherein each MMW contrast cell 119 corresponds to the energy level obtained by its accompanying detector 145. The raw energy level data is transferred from the detector array 142 to the computer 125 over the MMW camera-to-computer connection 144. Though the MMW perimeter 112 is smaller than the optical field-of-view 110 in this embodiment, other embodiments envision the optical field-of-view 110 and/or the MMW perimeter 112 being adjustable (such as beforehand or on-the-fly) to obtain a different resolution or a different data collection rate.

The MMW camera system 140 detects electromagnetic waves (EMW) in the millimeter (mm) frequency range from between 30 GHz to 300 GHz (possibly as low as 3 GHZ). Based on principles of blackbody radiation, all objects above absolute zero radiate millimeter waves (MMWs) essentially uniformly in all directions. Objects also reflect ambient MMW in the environment, such as from sources like the sun, interior lighting, or other objects emitting MMW radiation. Based on their composition and temperature, objects emit/absorb, reflect, or transmit this MMW radiation differently. This difference in RF power that is emitted, reflected, or transmitted from each object is measured by the camera. In principle, this approach works for both passive (no sources of MMW energy other than the ambient environment) and active (a MMW source illuminating the target). In practice, active cameras tend to be dominated by reflection due to the power of the illumination source being chosen to be much stronger than the passive MMW radiation emitted as part of the blackbody radiation. This embodiment depicts an active MMW radiation source 135, that actively directs MMWs (waves) 136 at the MMW field-of-view 112. Certain embodiments envision the active MMWs 136 including MMW radar, MMW lighting, etc. Since the wavelength of MMWs is long enough to penetrate clothing (compared to visible light, for instance) yet is short enough to resolve small objects that reflect or emit MMW differently than the background (such as a person, a gun concealed in the waistband or the ground, or a bomb concealed in a bag and left under a bench, just to name a few examples), MMWs are particularly well-suited for identifying concealed contraband.

Figure 5A:
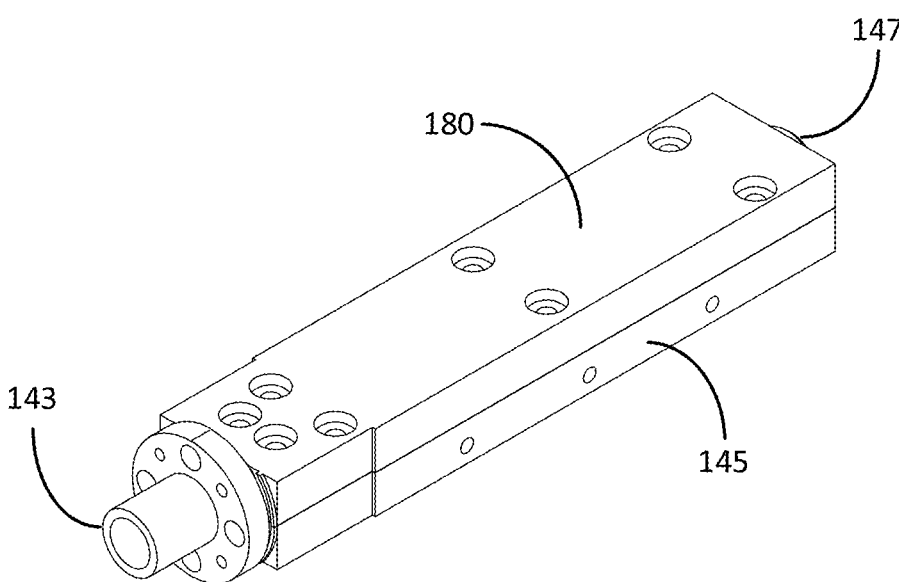
FIGS. 5A and 5B illustratively depict a MMW detector consistent with embodiments of the present invention.
Figure 5B:
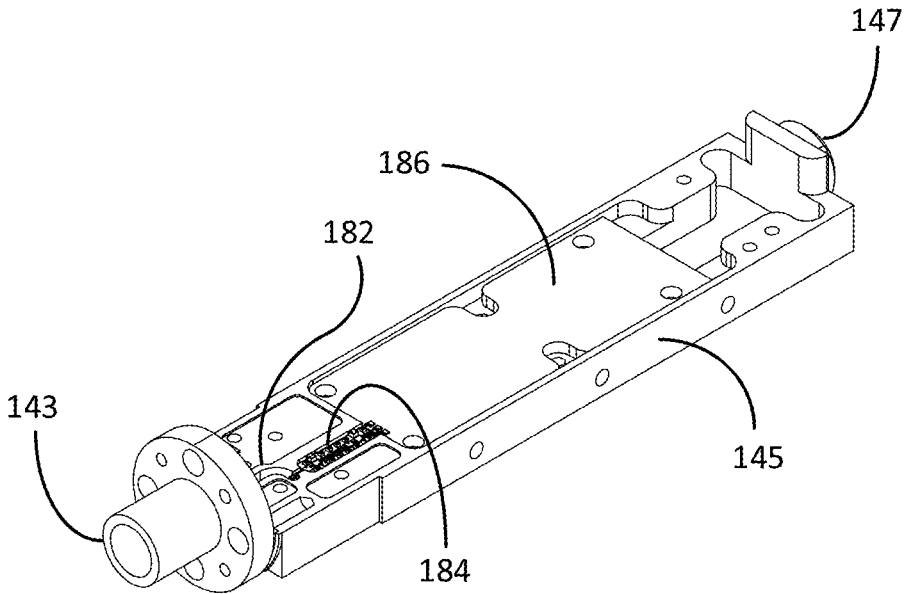

One commercial embodiment of a MMW detector 145, shown in FIGS. 5A and 5B, is the W-Band Radiometric Receiver produced by Eravant of Torrance, CA. This W-Band direction based radiometric receiver can measure the average power of the MMW radiation coming from a physical object in frequency range of 75 to 110 GHz. The MMW detector 145 receives MMW energy 152 at a MMW wave collecting end 143 (typically a horn and/or antenna), processes, and transmits a digital output signal at an output end/output connector 147. The MMW wave collecting end 143 is the MMW receiver 143 of the detector 145.

For clarity of definition, as used herein, FIG. 1E illustratively depicts the relationship between a MMW contrast cell, a MMW sub-image and a MMW picture. A single MMW detector 145 detects MMW energy from MMWs 152 that are incident to the MMW wave receiver end 143 of the MMW detector 145 (e.g., the receiving horn and/or antenna). The detected MMW incident energy 152 is digitized into a discrete single energy value that is then converted (such as by an A to D converter) into a single visual light spectral contrast cell, or simply MMW contrast cell 119. In one embodiment, each MMW contrast cell 119 is in a gray scale with a plurality of different optical shades of gray ranging from white to black. For example, a high MMW energy intensity (detected by a MMW detector 145) can correspond to a lighter MMW contrast cell and a low MMW energy intensity can corresponding to a darker MMW contrast cell. A single contrast cell 119 is not an image, rather it is simply a single grayscale pixel, of which multiple contrast cells 119 makes an image, or in this case a sub-image. The MMW detector array 142 comprises a plurality of MMW detectors 145, each having a line-of-sight at a different location (piece) in the array field-of-view 114. In this arrangement, the 16 MMW detector array 142 generates a grid of 4×4 (16) MMW contrast cells 119, which defines a MMW sub-image 154. A plurality of sub-images 154 are then stitched together (combined contiguously) to generate a MMW picture 150. In this example, the MMW camera 140 is moved or swept over the scene 105 (or a mirror deflects the MMW camera perspective by moving to sweep over the scene 105) within the MMW perimeter 112 to capture different sub-images 154 thereby generating the MMW picture 150 displayed on the display screen 130. The MMW picture 150 corresponds to the MMW perimeter 112.

Returning to FIG. 1C, as mentioned, the MMW detector output voltage signal of the MMW field-of-view 114 is electrically transmitted from the MMW detector array 142 to the computing system 125 via MMW camera-to-computer connection 144, which can be an electrical wire line for example. The computing system 125 conditions the MMW detector output voltage signal into a MMW intensity level enhanced MMW digital picture 150 (whereby metallic objects, in this example, are enhanced) that is sent over the computer-to-display connection 146 to the display screen 130 where it is displayed. The computer-to-display connection 146 can be a wireline connection between the computing system 125 and the display screen 130. The MMW digital picture 150 is defined by the MMW perimeter 112*b*, shown by the double dotted dashed perimeter line. The MMW digital picture 150 shows metallic objects of the scene 105 (i.e., images of metallic objects), which include a concealed gun shaped object 160, the metallic Christmas balls 108*b* and the metallic garland 106*b*. Though certain embodiments envision the MMW camera 125 collecting MMW's 152 from an active source 135, such as a MMW radar, other embodiments envision no active source wherein the MMW camera arrangement 100 is a passive system using only ambient radiation reflected and emitted from the subject of interest. Certain embodiments envision the MMW radiation source 135 emitting a wavelength of between 3-300 GHz with some embodiments envisioning the MMW radiation source 148 emitting a wavelength centered at 94 GHz. In this embodiment, the MMWs 152 emitted from the scene 101 are concentrated at that camera MMW detector receiving end 143 via a double convex refractive lens 132 to improve MMW signal of the otherwise outwardly angled radiating MMWs 152. It should be appreciated that the image plane 133 (of FIG. 1H) of the raw MMWs 152 are inverted on the camera side of the converging lens 132, which must be corrected for at the detectors, such as via software for example. Though this embodiment uses a double convex lens 132 as a converging lens, other lens embodiments are envisioned, such as a plano convex lens, a converging meniscus. Optionally, the image plane 133 of the target can be reduced via refractive lens, reflective surface, diffractive techniques, or a meta-lens, for example.

FIG. 1D is a line drawing illustratively showing the MMW picture 150 superimposed over the optical picture 115 in a joint overlaid MMW and optical picture 155. Certain embodiments envision the optical picture 115 of the scene 101 providing reference to the metallic objects 160, 106*b* and 108*b* from the MMW digital picture 150. Here, the display screen 130 depicts the superimposed (joint) optical MMW and optical picture 155 showing the person 102*b* (or some other living target) and the Christmas tree 104*b* along with the gun shaped object 160 that is obscured or otherwise unidentifiable in the optical picture 115 alone. Some embodiments envision a software algorithm retained and executed in the computing system 125 that matches the gun shaped object 160 to a best fit gun type based on digital recognition and or Artificial Intelligence (AI). Other embodiments simply identify that there is an object distinct from the background, which can serve as a warning to an end-user with alerts, such as light/s, sound, vibration, etc. Some embodiments imagine an alarm only sounding if an object is above a certain size or conforms to a certain shape so that people do not get harassed for wearing a wedding ring or eyeglasses, for example. The optical camera 120, the converging lens 132, MMWs 152 and MMW camera 140 are called out for reference. The other elements depicted are called out in relation to FIGS. 1B and 1C.

Figure 1F:
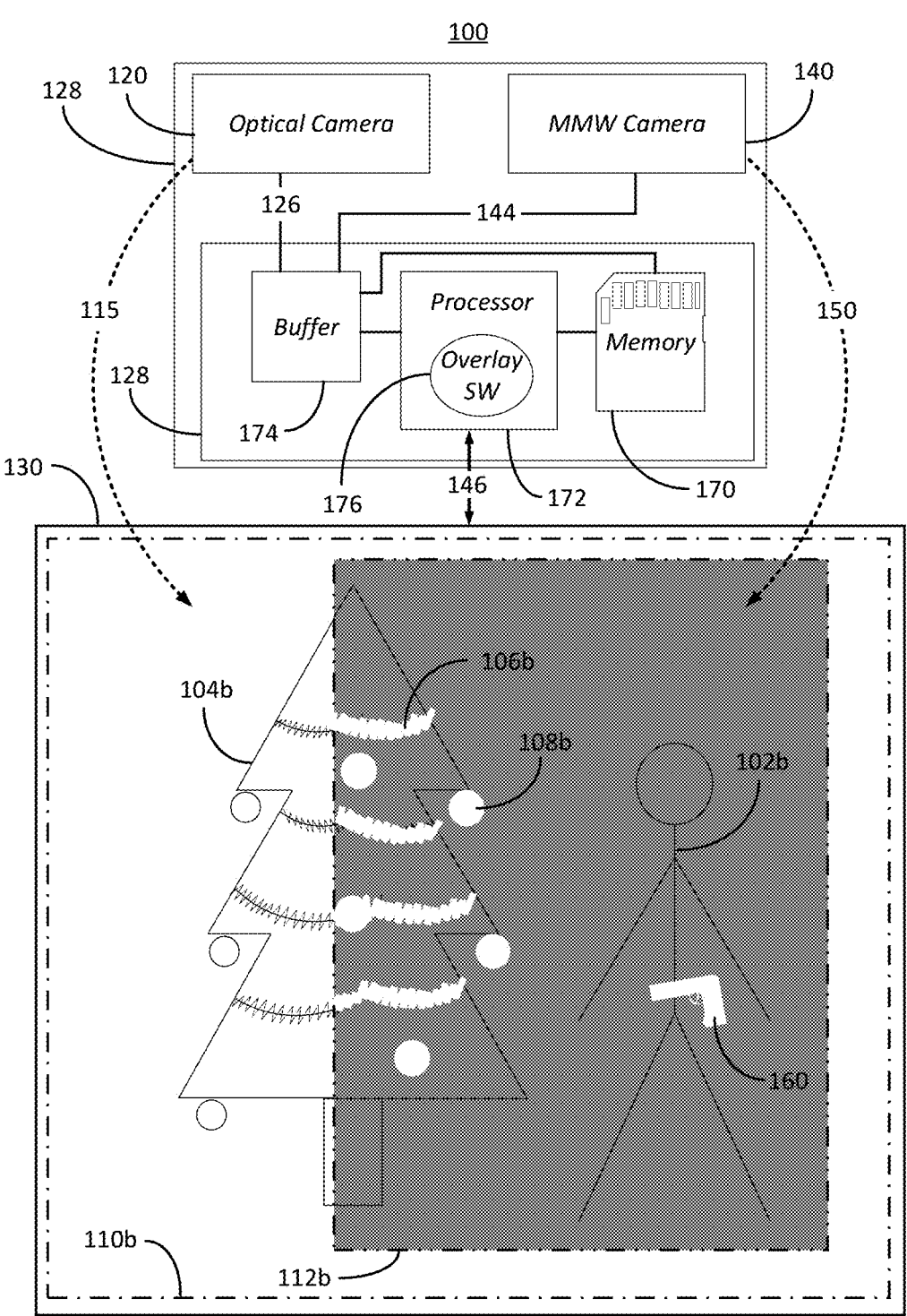
FIG. 1F is a block diagram of representative elements in the camera arrangement consistent with embodiments of the present invention.

FIG. 1F is a block diagram of representative elements in the camera arrangement 100 consistent with embodiments of the present invention. As previously discussed, the camera arrangement 100 generally comprises an optical camera 120 configured and arranged to capture an optical picture 115 of a scene 105 in addition to a MMW camera 140 configured and arranged to capture a plurality of MMW sub-images 154 MMW of a portion of the scene 105. Both the optical picture 115 and the MMW picture 150, which is overlaid on the optical picture 115, are displayed on the display screen 130. In this figure, the optical picture field-of-view perimeter 110*b*, shown by the dot-dashed line, depicts the border of the displayed optical picture 115. The MMW picture perimeter 112*b*, shown by the double-dot-dashed line, depicts the border of the displayed MMW picture 150. The displayed MMW picture 150 is overlaid on the displayed optical picture 115. The displayed MMW picture 150 is shown in as a gray rectangle with the metallic gun shaped object 160, metallic garland 106*b* and the metallic Christmas ball 108*b* the illuminated (in white). The black outlines represent the displayed optical picture 115 of the Christmas tree 104*b*, the non-MMW garland portions 106*b*, non-MMW Christmas balls 108*b* and the person 102*b*.

In the present configuration, the optical camera 120 captures an image of the scene 105 with or without assisted illumination from the light source 124 and sends the optical picture data to a buffer storage 174 residing in the computing system 128. The buffered optical picture data can be sent to nonvolatile memory 170, which in certain embodiments is a solid-state non-transitory flash memory card, in addition to a processor 172 where the optical picture data is formatted (the optical formatting algorithm operated by the processor 172) as a displayable optical picture that is sent 146 to the display device 130. As shown by the connections between the buffer 174, the memory device 170, and the processor 172, the buffered optical picture (data) can be stored to the memory device 170 and/or sent directly to the processor 172 for formatting. The formatted optical picture 115 can then be sent to and the memory device 170 where the formatted optical picture 115 can be retained for future access, for example.

Similarly, the MMW camera 140 captures at least one MMW sub-image 154 of at least a portion of the scene 105, with or without assisted MMW illumination 136, and sends the MMW sub-image data to the buffer storage 174. The MMW sub-image data is the data that is output by the MMW camera 140 to the computer 125 or display screen 130, wherein each MMW detector 145 receives a concentration of MMWs 152 from the target scene 105 and converts the received MMWs 152 into output MMW intensity data. The aggregate of the MMW intensity data values from each of the detectors 145 collectively defines MMW sub-image data. The buffered MMW sub-image data can be sent directly to the memory device 170 that is in communication with the processor 172 or directly to the processor 172. The processor 172 is arranged and configured to execute software algorithms 176 that not only convert the MMW sub-image data as a displayable MMW sub-image 154 but can overlay the MMW sub-image 154 over the optical picture 115 (or optionally optical image data). Moreover, the processor 172 can operatively execute other software programs, such as those that stitch together in either or both x and y directions, a plurality of MMW sub-images 154 into an overall MMW picture 150 of at least a portion of the scene 105. The MMW picture 150, the MMW sub-images 154, and the raw data received from the MMW camera 140 can be retained in the memory device 170. The MMW picture 150 (stitched together from the MMW sub-images 154) is displayed on the display screen 130 either overlaid on the optical picture 115 or displayed independently. These pictures 115 and 150 can be produced later from the memory device 170, as well.

Figure 1G:
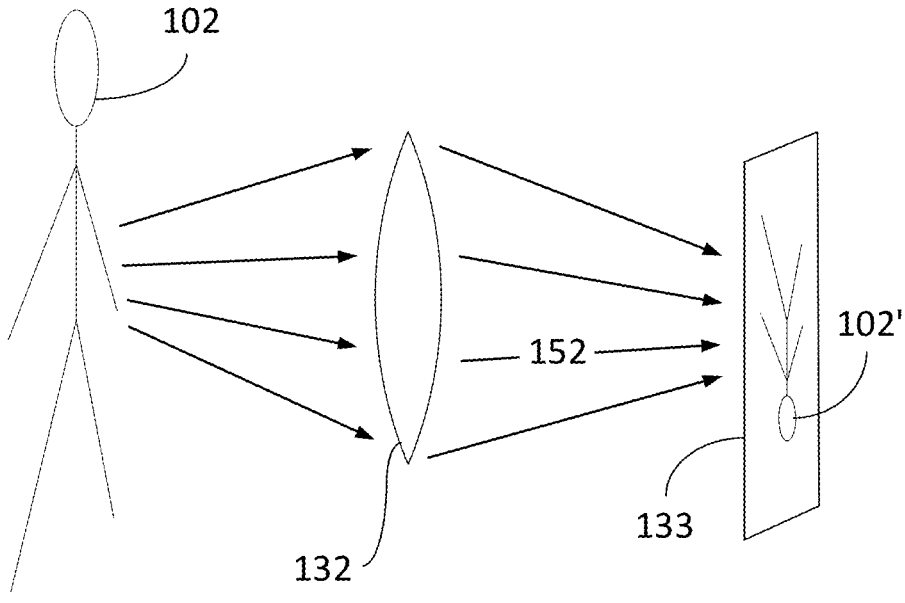
FIGS. 1G and 1H are line drawings depicting MMW concentrators that recreate the image plane of the target scene consistent with embodiments of the present invention.
Figure 1H:
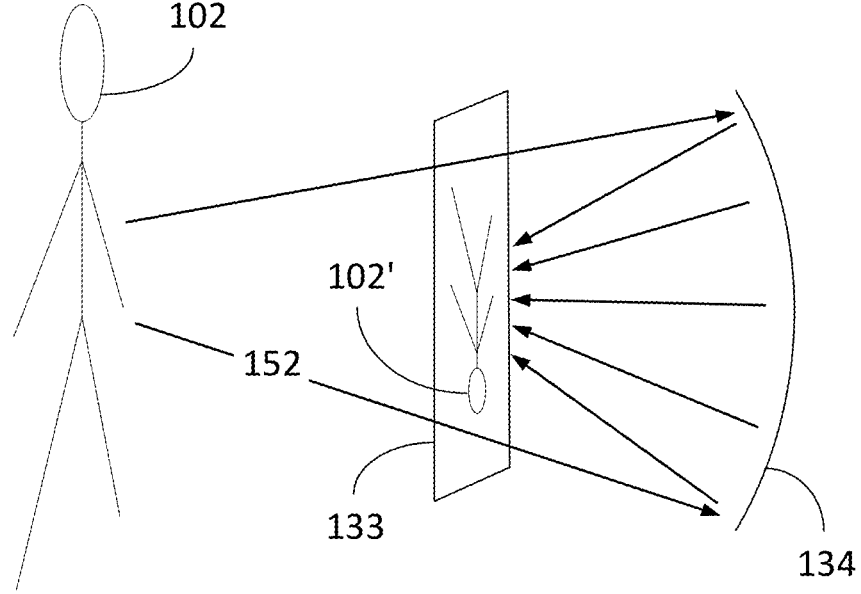

FIGS. 1G and 1H are line drawings depicting MMW concentrators that recreate the image plane 133 of the target scene consistent with embodiments of the present invention. As depicted in FIG. 1G, MMWs 152 emitted from the target person 102 are divergently angled (that is spreading out) until refracted at a double convex refractive lens 132 where the MMWs 152 are redirected to converge at the MMW camera 140, as depicted in FIGS. 1C and 1D. As shown, the resultant image plane 133 of the person 102' is inverted. FIG. 1H illustratively depicts an alternate embodiment wherein a parabolic reflector (mirror) reflects the MMWs 152 divergently emitted from the target person 102 in an inverted concentrated image plane 133 of the person 102'.

FIGS. 2A-2E are line drawings that illustratively depict a MMW camera system consistent with embodiments of the present invention. FIGS. 2A-2E are described in view of FIGS. 1B-1E and 1H, which may depict elements described but not shown in FIGS. 2A-2E. FIGS. 2A-2E use concepts involving multiple reflectors 134 cooperating or otherwise working together to recreate a reduced sized image plane 133 that is small enough for the MMW camera 140 create a MMW picture 150. With respect to FIG. 2A, this MMW camera system embodiment 200 is a multi-degree of freedom MMW collector system, wherein the MMW camera 140 receives MMWs 152 from different portions of a scene 105 indirectly from mirrors 202, 204 and 206. Any one of more of the mirrors 202, 204 and 206 can be flat or shaped like the reflector 134 of FIG. 1H and the MMW camera 140 being shaped to accommodate the curvature of the one or more mirrors 202, 204 and 206. The MMW camera 140 is fixed but can capture MMW sub-images 154 and MMW pictures 150 via a redirectable mirror arrangement 205 that includes mirrors 202, 204 and 206. As shown, the MMW camera system 200 comprises a fixed MMW camera 140 that is mounted to an arrangement support frame 236. The arrangement support frame 236 connects to the base 230 and the upper support 222. In this system 200, the base 230 is envisioned to rest on the floor 210. However, other embodiments envision the system 200 resting on a table or a platform (not shown). The mirror arrangement comprises a receiving mirror 202, a static reflecting mirror 204, and an oscillating mirror 206. The receiving mirror 202 can tilt 212, as shown by the arrow 212, to capture various MMW pictures 150 in a vertical direction. The receiving mirror 202 is tilted 212 via pivot points 234 in the stays 232. The receiving mirror 202 can further be rotated around a turret 220 in the direction indicated by the arrow 214. The rotation facilitates capturing MMW pictures 150 in various locations along the horizontal direction 214. In this embodiment, the turret 220 includes bearings (not shown) all of which is supported by a curved upper support segment 222A of the upper support 222.

From a functional perspective, the MMW camera system 200 is adjusted to take a MMW picture 150 of a scene 105 (a scene of interest) by rotating 214 the receiving mirror 202 via the turret 220 in front of the scene 105. The receiving mirror 202 is also tilted 212 to capture the vertical portion of interest of the scene 105 via tilting (see arrow 212) the receiving mirror 202 about the pivot points 234. The receiving mirror 202 directs the MMWs 152 from the scene 105 downwards to the static reflecting mirror 204, which aims the MMWs 152 to the oscillating mirror 206, which in turn redirects the MMWs 152 to the MMW camera 140. The oscillating mirror 206 tilts/oscillates side to side 242 and sweeps from an upper location to a lower location 244, which provides different perspectives of a scene 105 or target within the scene 105 to obtain different MMW sub-images 154 within the MMW perimeter 112 (as depicted in FIG. 2B). In other words, the oscillating mirror 206 tilting/oscillating limits cooperates with the receiving dish focus and the spacing of the receivers 140 to define the left and right boundaries of the MMW perimeter 112, and the sweeping limits cooperate with the receiving dish focus and the spacing of the receivers 140 to define the upper and lower boundaries of the MMW perimeter 112. Though not easily seen from this perspective, the oscillating mirror 206 comprises at least one motor 138 (see FIG. 3C, for example) that is supported via a gimbal arrangement (not shown) on a crossbar 224A and stabilizing frame 224B. The crossbar 224A and stabilizing frame 224B are connected to the upper support 222 and the arrangement support frame 236, respectively. The upper support 222 extends to the rear of the system 200 via an extender rail 222B that can be used to help support the MMW camera 140 and oscillating mirror 206 in addition to providing a platform frame that can be used in conjunction with a tabletop (not shown). In this embodiment, the upper support 222 essentially matches the shape of the base 230.

Figure 2A:
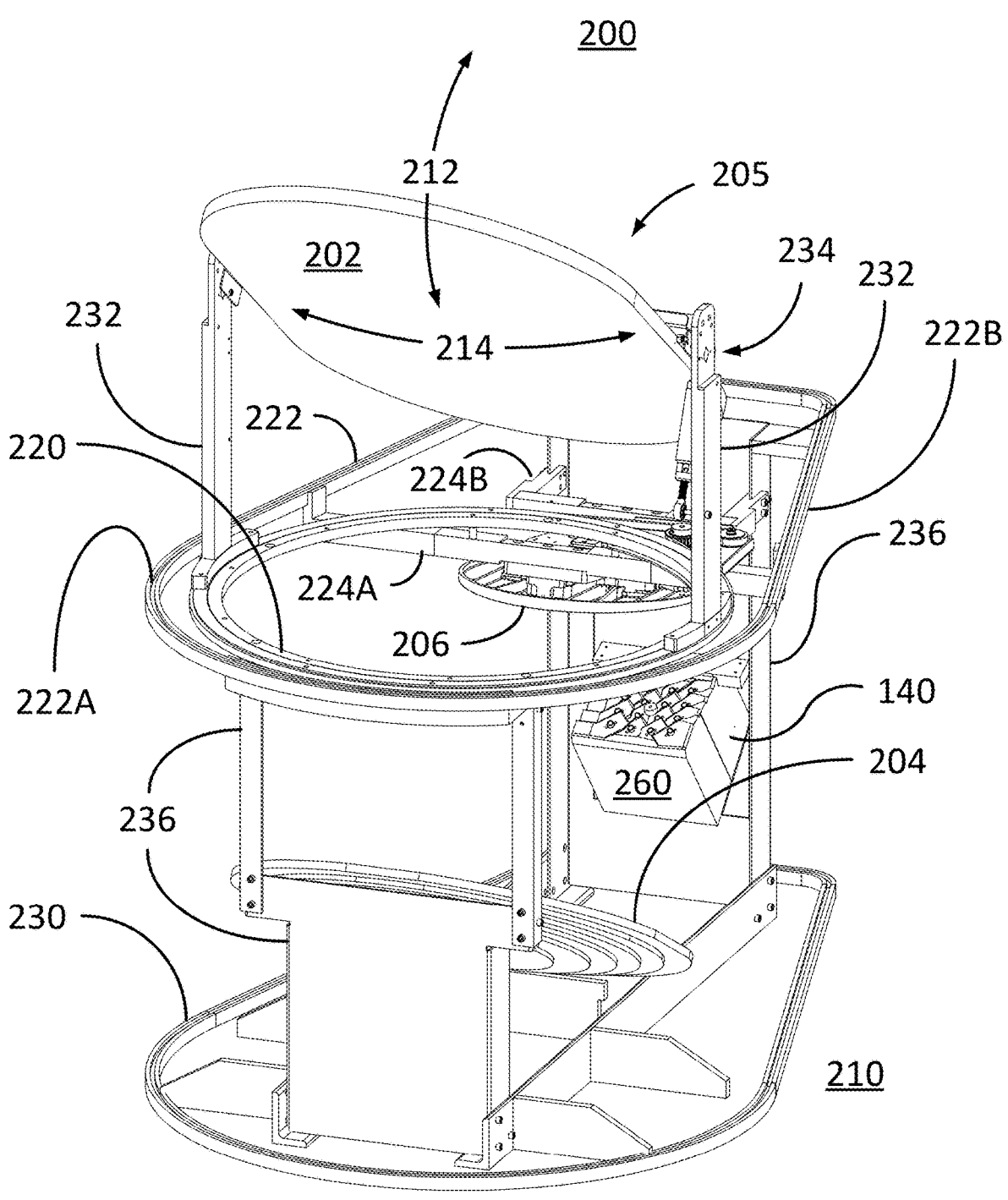
Figure 2B:
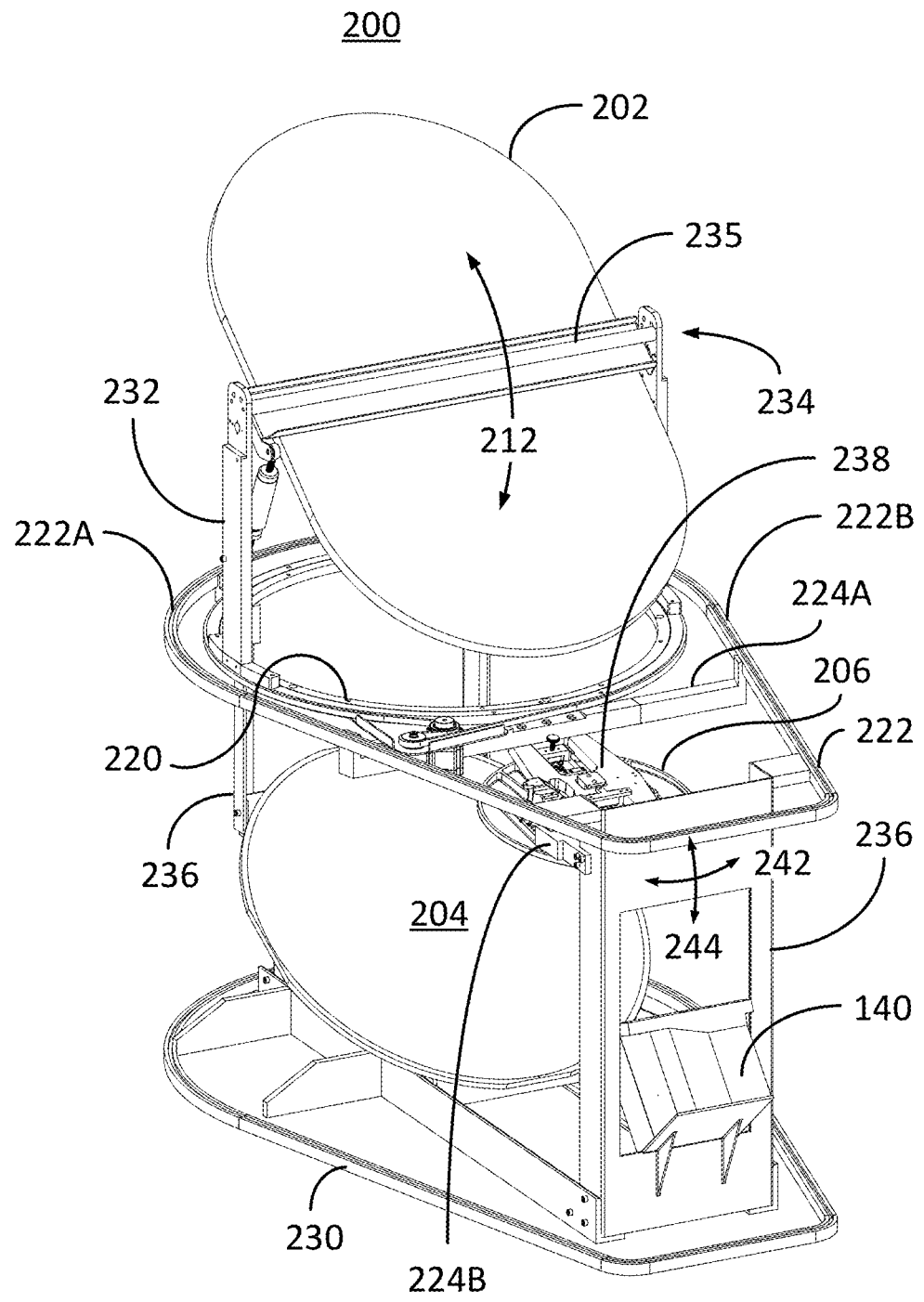

FIG. 2B is a back view line drawing of the MMW camera system 200 of FIG. 2A. As shown here the backside of the receiving mirror 202, a static reflecting mirror 204, and an oscillating mirror 206. The receiving mirror 202 is presented with the crossbar 235 and pivot points 234, which depict how the receiving mirror 202 can tilt 212 to adjust the MMW perimeter 112 in the vertical direction. The receiving mirror 202 is connected to the rotating turret 220, nestled in the curved upper support segment 222A, via the stays 232. The reflective surface of the static reflecting mirror 204 is somewhat facing the reader. As previously discussed, the static reflecting mirror 204 is mounted to the arrangement support frame 236 and other supporting structures of the base 230. The oscillating mirror 206 is mounted to the oscillating mirror crossbar frame 224A and oscillating mirror stabilizing frame 224B, which are connected to the upper support 222 and the arrangement support frame 236, respectively. The motorized gimbal arrangement 238 drives the oscillating mirror 206 in an arc both side to side 242 and up and down 244, as shown by the arced arrows. The rear of the MMW camera 140 is shown supported by the arrangement support frame 236.

Figure 2C:
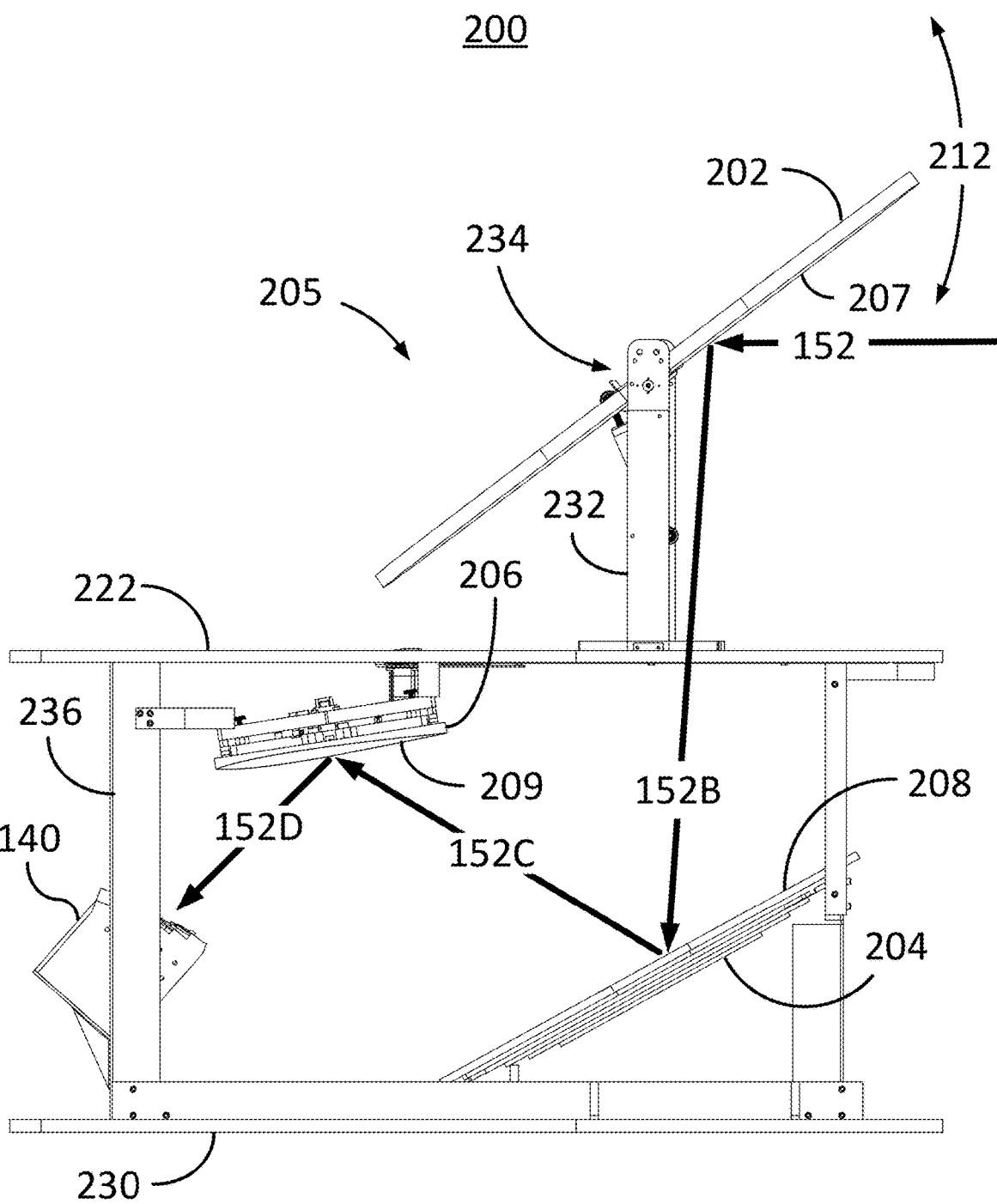

FIG. 2C is a side view line drawing of the MMW camera system 200 of FIG. 2A depicting the redirected MMWs 152 via the redirectable mirror arrangement 205. As shown, the receiving mirror 202 redirects the incoming MMWs 152 from the targeted scene 105 (see the MMW arrow 152) towards the static reflecting mirror 204, shown by the first redirected MMWs 152B (see the MMW arrow 152B). The static reflecting mirror 204 redirects the first redirected MMWs 152B towards the oscillating mirror 206, shown by the second redirected MMWs 152C (see the MMW arrow 152C). The oscillating mirror 206 redirects the second redirected MMWs 152C towards the MMW camera 140, shown by the third redirected MMWs 152D (see the MMW arrow 152D). The MMW camera 140 converts the third redirected MMWs 152D into a sub-image data 154 corresponding to the MMW field-of-view 114. In this embodiment, the receiving mirror 202 comprises a flat reflecting surface 207, the static reflecting mirror 204 comprises a concave reflecting surface 208 and the oscillating mirror 206 comprises a convex reflecting surface 209. One of the stays 232, the upper support 222, the arrangement support frame 236 and the base 230 are shown for reference. The receiving mirror 202 depicts how it can be tilted 212 about the pivot point 234 to change the MMW perimeter 112 in the vertical direction. This present configuration leverages using a static MMW camera 140 in conjunction with the oscillating mirror 206 to build a MMW picture 150 from a plurality of MMW sub-images 154. In this configuration, the oscillating mirror 206 has an advantage of presenting a lot of different MMW field-of-views 114 in a MMW perimeter 112 very quickly without introducing noise from jarring the electronics of the MMW camera 140 thereby improving the quality of the MMW picture 150. For example, in one camera arrangement, the oscillating mirror 206 sweeps from side to side 242 and up and down 244 providing different MMW field-of-views 114 for the MMW camera 140 to capture 125 MMW sub-images 154 in under 3 seconds. It should be appreciated that there are other schemes to capture MMWs 152 with no mirrors, with more or less mirrors, moving multiple mirrors to create sub-images or moving the detector/radiometer array 140 either separately or in conjunction with mirror movement without departing from the scope and spirit of the present invention.

FIGS. 2D and 2E illustratively depict the MMW camera system 200 of FIG. 2A with the rotating turret 220 rotated to the left and right. FIG. 2D depicts the receiving mirror 202 rotated 214 to the left via the turret 220, wherein the receiving mirror 202 is set up to redirect incoming MMWs 152 from a scene to the left. FIG. 2E depicts the receiving mirror 202 rotated 214 to the right via the turret 220, wherein the receiving mirror 202 is set up to redirect incoming MMWs 152 from a scene to the right. The MMWs 152 bounce, or otherwise deflect, off the receiving mirror 202 and pass through the turret 220 via a turret aperture (or opening) 225 in the turret 220, as shown. When the turret 220 is rotated, the center of the turret aperture 225 does not change relative to the static reflecting mirror 204, which allows the rest of the mirrors 204 and 206 to maintain the angles needed to deflect the MMWs 152 to the MMW camera 140. The static reflecting mirror 204 is arranged relative to the receiving mirror 202 so that no matter where the receiving mirror 202 is pointed, the first redirected MMWs 152B bounce off the static reflecting mirror 204 to the oscillating mirror 206 and ultimately to the MMW camera 140.

Figures 3A, 3B:
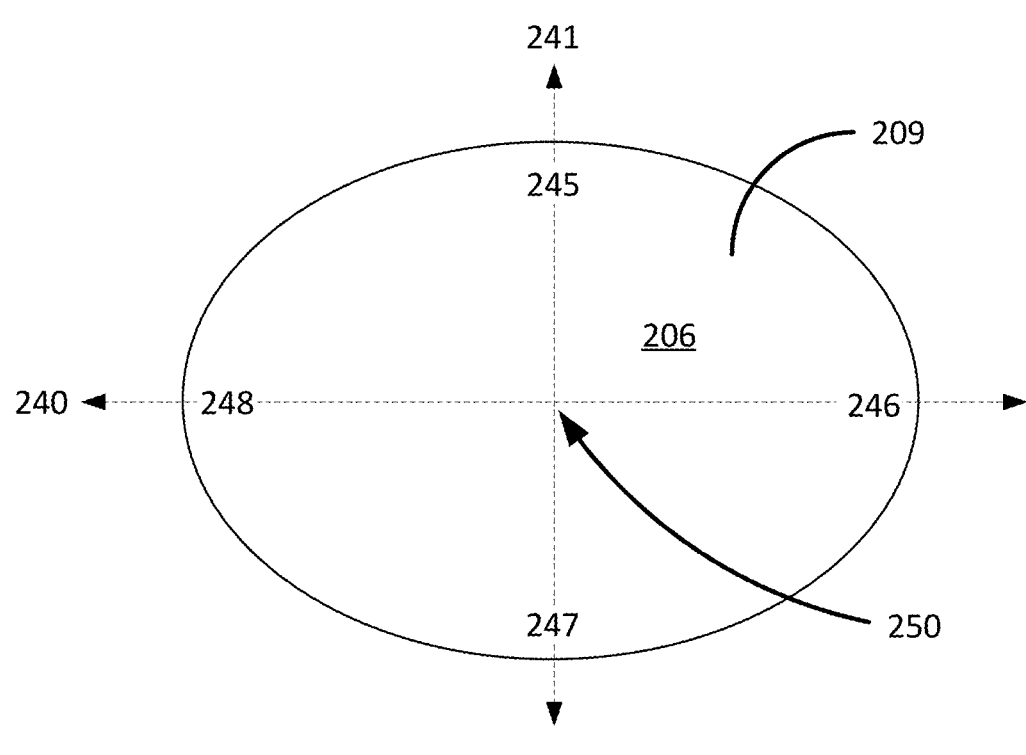

FIGS. 3A-3J illustratively depict the motion of the oscillating mirror 206 consistent with embodiments of the present invention. FIG. 3A is a front view of the oscillating mirror 206. In this embodiment, the oscillating mirror 206 has an elliptical face, as shown, presenting the reflecting surface 209, facing outward, with the vertices and co-vertices labeled along the axes of motion 240 and 241. The left vertex 248 and the right vertex 246 are defined at the edges of the oscillating mirror 206 along the horizontal axis 240. The upper co-vertex 245 and lower co-vertex 247 are defined at the edges of the oscillating mirror 206 along the vertical axis 241. The oscillating mirror 206 pivots about the pivot point 250 with the left vertex 248 and the right vertex 246 going in and out of page along the horizontal axis 240 to collect a plurality of different MMW sub-images 154 that defines the horizontal limits of MMW perimeter 112. These horizontal MMW sub-images 154 make up the rows 168 of MMW sub-images 154 in a MMW picture 150 (see FIG. 7D). The oscillating mirror 206 pivots about the pivot point 250 with the upper co-vertex 245 and lower co-vertex 247 sweeping in a half-cycle in and/or out of page along the vertical axis 241 to collect a plurality of different MMW sub-images 154 that defines the vertical limits of the MMW perimeter 112. These vertical MMW sub-images 154 make up the columns of MMW sub-images 154 in a MMW picture 150 (see FIG. 7D). The oscillating mirror 206 cycles back and forth along the horizontal axis 240 over a plurality of cycles to every half-cycle of the oscillating mirror 206 sweeping along the vertical axis 241.

FIG. 3B is a side view of the oscillating mirror 206 with the reflecting surface 209 facing upward. The vertices 246 and 248 move up 242A and down 242B about the pivot point 250 in a back-and-forth oscillating motion over a plurality of cycles while the co-vertices 245 and 247 move, or sweep, in a half cycle (or optionally in one cycle) up 244A and/or down 244B about the pivot point 250.

FIGS. 3C-3H illustratively depict the motion of the oscillating mirror 206 consistent with embodiments of the present invention. FIGS. 3C-3H are described in view of FIGS. 3A and 3B. FIG. 3C shows the motorized gimbal 238 (that is a motor that drives the gimbal arrangement) supporting the oscillating mirror 206 in a starting position with the left vertex 248 tipped in the upper position 242A (hence the right vertex 246 tipped in the lower position 242B) and the lower co-vertex 247 tipped in the upper position 244A (hence the upper co-vertex 245 tipped in the lower position 244B). FIG. 3D shows the orientation of the oscillating mirror 206 and motorized gimbal arrangement 238 of FIG. 3C but rotated 90° counterclockwise. Here, only the right vertex 246, lower co-vertex 247 and left vertex 248 can be seen. The oscillating mirror bottom side 252 is shown.

FIGS. 3E and 3F illustratively depict the sweeping half-cycle motion of the oscillating mirror 206 in an ending position which is the opposite orientation of the starting position depicted in FIGS. 3C and 3D. The half-cycle along the vertical axis 241 facilitates constructing a MMW picture 150 in the vertical direction from a plurality of MMW sub-images 154 captured as the oscillating mirror 206 sweeps from the starting position of FIGS. 3C and 3D to the ending position of FIGS. 3E and 3F. As shown, the lower co-vertex 247 is tipped in the down position 244B (hence the upper co-vertex 245 tipped in the upper position 244A). FIG. 3F shows the orientation of the oscillating mirror 206 and motorized gimbal arrangement 238 of FIG. 3E but rotated 90° counterclockwise.

FIGS. 3G and 3H illustratively depict the underside of the oscillating mirror 206 with the right co-vertex 246 extending upwards 242A. FIG. 3G shows the lower co-vertex 247 in an upper position 244A and FIG. 3H shows the lower co-vertex in the lower position 244B illustrating a half-cycle sweep to construct a MMW picture 250 in the vertical direction.

FIGS. 3I and 3J illustratively depict the back-and-forth oscillating motion of the oscillating mirror 206, which displays the underside of the oscillating mirror 206 with the lower co-vertex 247 tilted upwards 244A. FIG. 3I depicts the left vertex 248 tilted upwards 242A and FIG. 3J depicts the left vertex 248 tilted downwards 242B. The maximum displacement of the left vertex 248 and right vertex 246 in a cycle (as shown in FIGS. 3I and 3J) defines the horizontal limits of the MMW perimeter 112. The oscillations of the left vertex 248 and right vertex 246 construct the horizontal portions of a MMW picture 150. The left vertex 248 and right vertex 246 will cycle back and forth a plurality of times, such as 25 cycles, for every half cycle of a co-vertex, such as the lower co-vertex 247 going from a maximum tilt upwards 244A to a maximum tilt downwards 244B. One operation embodiment contemplates one hundred sub-images 154 being taken along the horizontal direction as the oscillating mirror 206 pivots a one-half cycle about the pivot point 250 along the horizontal axis 240 thereby constructing a first row of 100 MMW sub-images 154 of a MMW picture 150. The oscillating mirror 206 then indexes to a new row (i.e., the oscillating mirror 206 rotates the equivalent of 1 row or less along the vertical axis 241) wherein the MMW camera 140 snaps one hundred new MMW sub-images 154 (that is data for the MMW sub-images 154) while the oscillation mirror 206 pivots one-half cycle about the pivot point 250 along the horizontal axis 240. In this example, the MMW picture 150 generated by moving the oscillating mirror 206 comprises one hundred MMW sub-images 154 per row 168 for twenty-five rows 168, which results in a MMW picture 150 having 2,500 sub-images. Assuming the oscillating mirror 206 cycles along the horizontal axis 240 three times per second, the MMW picture 150 can be taken in about eight seconds.

Though the embodiment described in FIGS. 3A-3J depict the motion of the oscillating mirror 206, the same result could be accomplished by oscillating the receiving mirror 202, the static reflecting mirror 204 or some other mirror integrated in the MMW camera system. Optionally, as discussed above, the MMW camera 140 could be made to move/oscillate alone or in conjunction with an oscillating mirror.

Figure 4A:
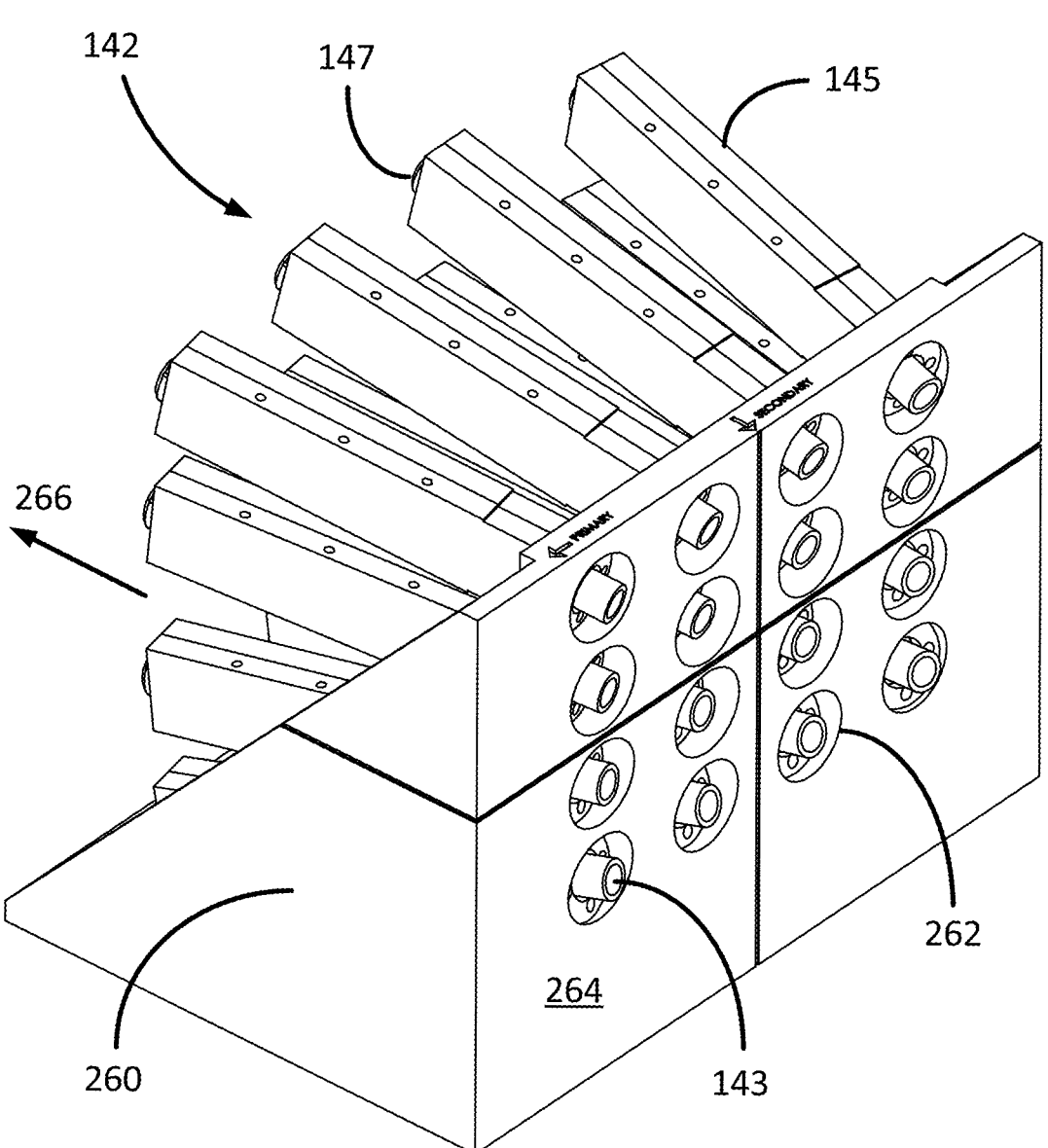
FIGS. 4A-4D are line drawings depicting a MMW camera arrangement consistent with embodiments of the present invention.

FIGS. 4A-4D are line drawings depicting a MMW camera arrangement consistent with embodiments of the present invention. FIG. 4A shows an isometric view of a MMW camera embodiment (radiometer array) 140 comprising 16 MMW detectors 145 anchored to a camera armature 260, which in this embodiment is a support housing 260. The camera housing 260 comprises 16 apertures (holes) 262 in the housing front face/end 264, each aperture 262 accommodating a respective MMW detector receiver end 143. The camera housing 260 is statically mounted to the arrangement support frame 236 as shown in FIG. 2A, for example. The MMW camera detector array 142 is arranged as a four by four (4×4) array 142 of detectors 145 with their respective output connectors 147 extending in a direction towards the back 266 of the housing 260, shown by the arrow 266. Though each MMW detector (or radiometer) 145 is described herein as a single pixel detector, certain other embodiments envision a radiometer comprising a plurality of pixels by having a plurality of horns and multiple detection and amplification sections. One structure accomplishing this can be a visible camera CCD-like structure (charge-coupled device called a Focal Plane Array) that could be, for example, an array of 100×100 radiometers all on a flat wafer but each one fed by a 3D horn array that provides a 3D curve.

Figure 4B:
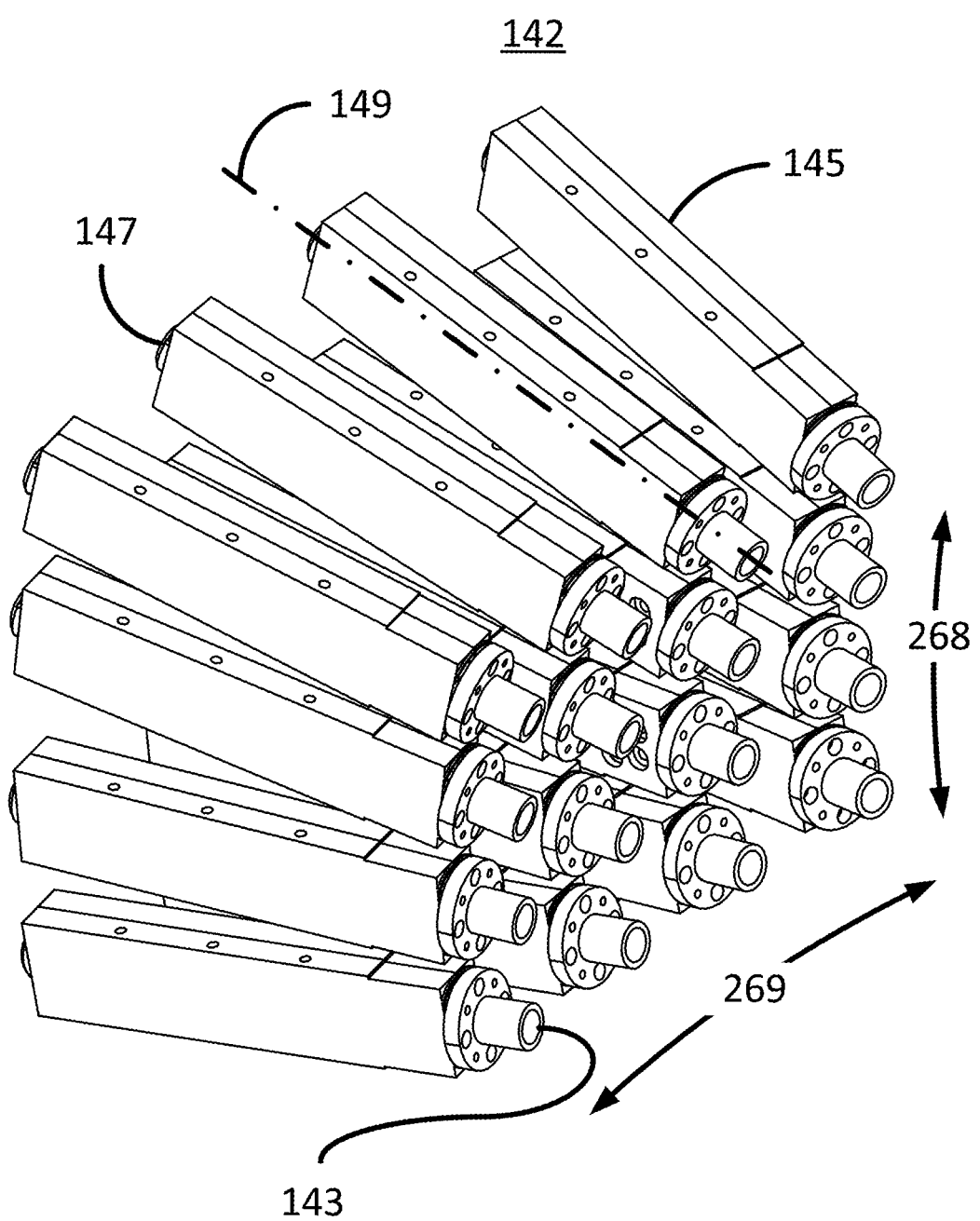
Figure 4C:
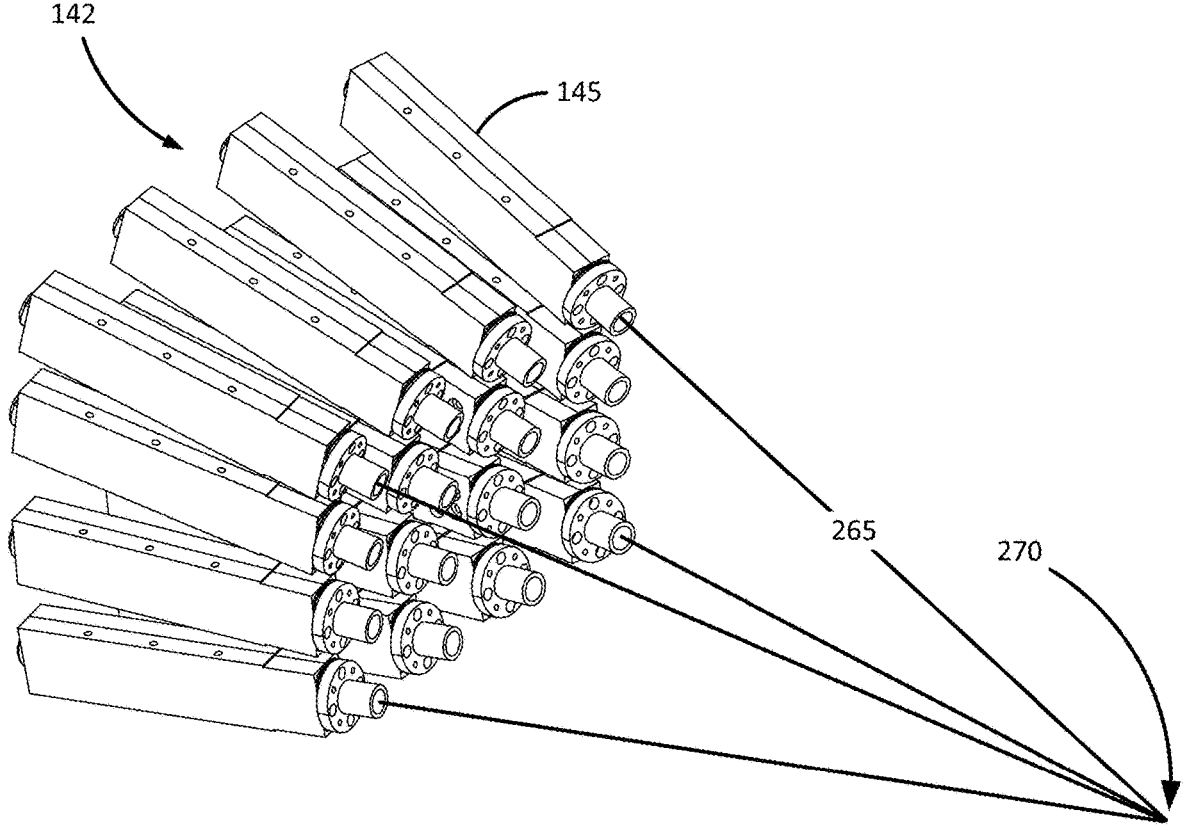
Figure 4D:
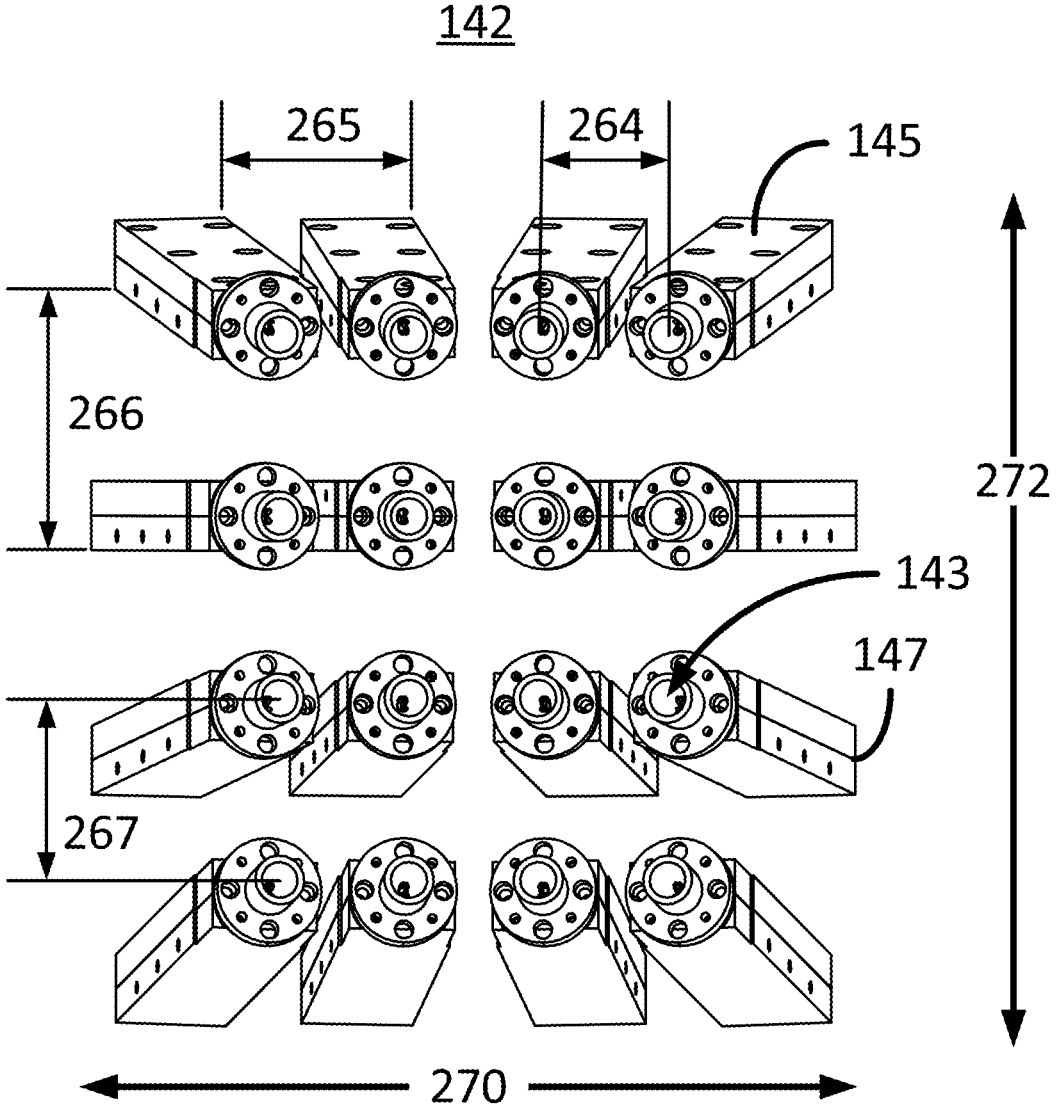

FIGS. 4B-4D are different perspective views of the detector array embodiment 142 of FIG. 4A without the camera housing 260 to better understand the orientation of the detectors 145 in the array 142. As shown in FIG. 4B and FIG. 4C, each of the detectors 145 has a line-of-sight 265 that converge in front of the array 142. Each line-of-sight 265 extends along a central axis 149, wherein the central axis 149 extends concentrically through the detector output end 147 and the detector receiving end 143. By concentrically it is meant down the center of the detector 145 passing through the middle of (the center of) the detector output end 147 and the detector receiving end 143. Hence, if the detector receiving end 143 is circular shaped, concentric is in the center of the circle, for example. In some embodiments, the line-of-sight 265 of each detector 145 points towards a common focal point 268. The MMW detector receiver ends 143 of the 4×4 array 142 are angled in a concave shape with the vertical MMW detectors 145 arced as shown by the vertical concave arrow 268 and the horizontal MMW detectors 145 arced as shown by the horizontal concave arrow 269. In this way, the MMW matrix/array 142, generates a less distorted MMW picture 150 by adjusting or otherwise compensating for the curvature due to the movement of the oscillating mirror 206 moving back and forth 242A and 242B while sweeping in a half-cycle 244A or 244B. Certain other embodiments contemplate the MMW detectors 145 being in a plane or some other complex curve instead of the line-of-sight 265 of each detector 145 pointing towards a common focal point 268. FIG. 4D is a front view of the detector array embodiment 142 of FIG. 4A without the camera housing 260 showing the offset of the MMW detector receiver ends 143 of the 4×4 array 142 with respect to the respective output connectors 147 of the MMW detectors 145. As shown, in the horizontal direction 270 the MMW detector receiver ends 143 are horizontally front spaced 264 closer than the horizontally rear spaced 265 output connectors 147. Similarly, in the vertical direction 272, the MMW detector receiver ends 143 are vertically front spaced 267 closer than the vertically rear spaced 266 output connectors 147.

FIGS. 5A and 5B illustratively depict a MMW detector 145 consistent with embodiments of the present invention. FIG. 5A is an isometric line drawing of a W-Band Radiometric Receiver MMW detector 145, which is commercially available from Eravant of Torrance, CA. As shown in FIG. 5A, the MMW detector embodiment 145 depicts the MMW detector receiving end 143, which receives or collects MMW energy 152 and a video output connector 147, which in this commercial embodiment comprises a 6-pin connector. The internal components of FIG. 5B are protected by the housing 180. Some of the key components of the MMW detector 145 include the waveguide 182, which concentrates and channels the MMW wave energy 152 to an amplifier 184 that boosts the signal to be converted from analog to digital in the analog to digital converter and processor 186. A digital video signal is output via the digital video output connector 147, which in the embodiment of FIG. 1C is piped to the computer system 28 via the MMW camera-to-computer connection. In short, raw MMWs 152 are received at the detector receiving end 143 and converted to digital MMW intensity data that is output via the detector output end 147 to be processed into a MMW contrast cell 119 that is displayed on the display screen 130.

Figure 6A:
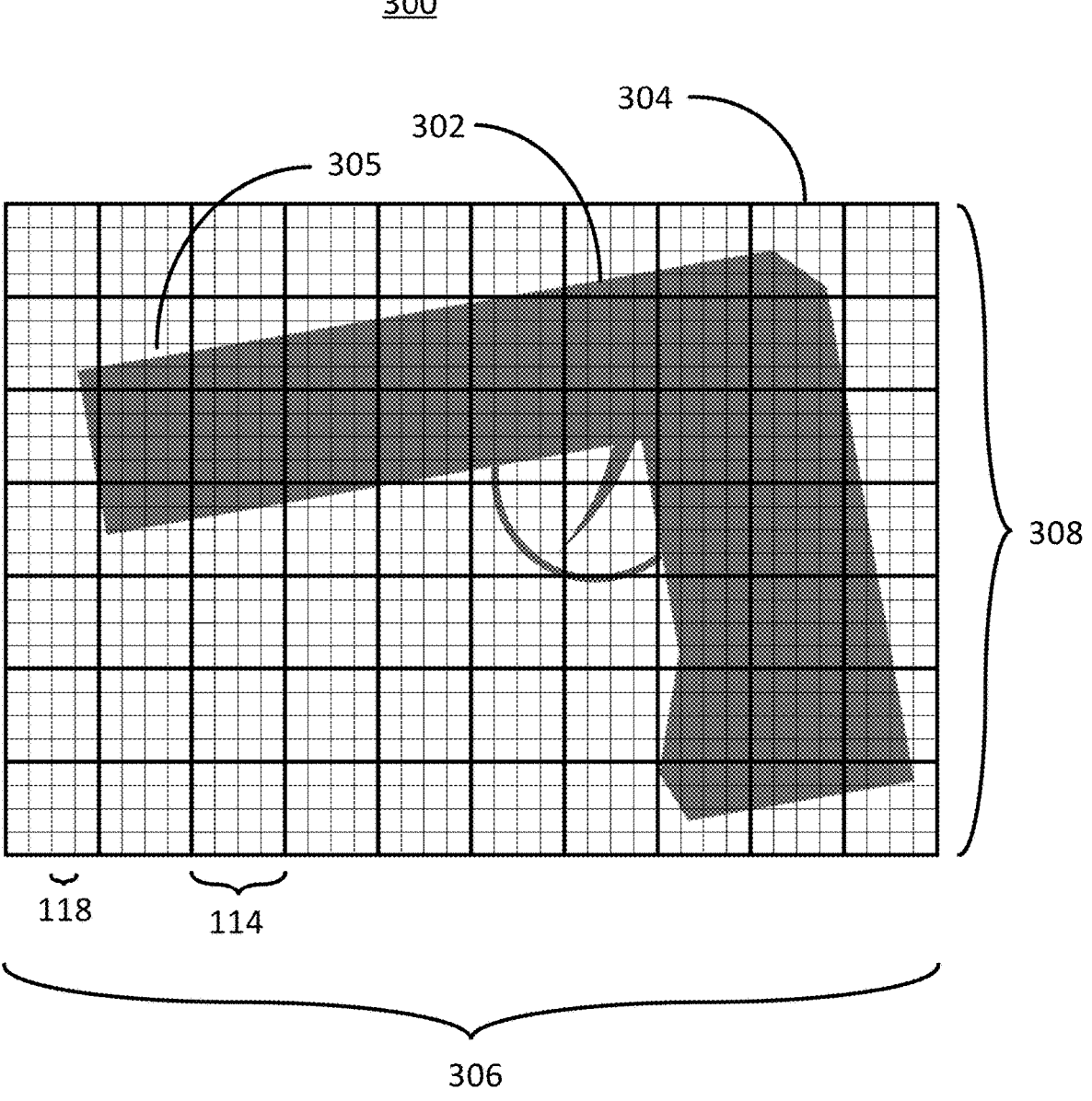
FIGS. 6A-6B illustratively depict a MMW picture of a gun consistent with embodiments of the present invention.
Figure 6B:
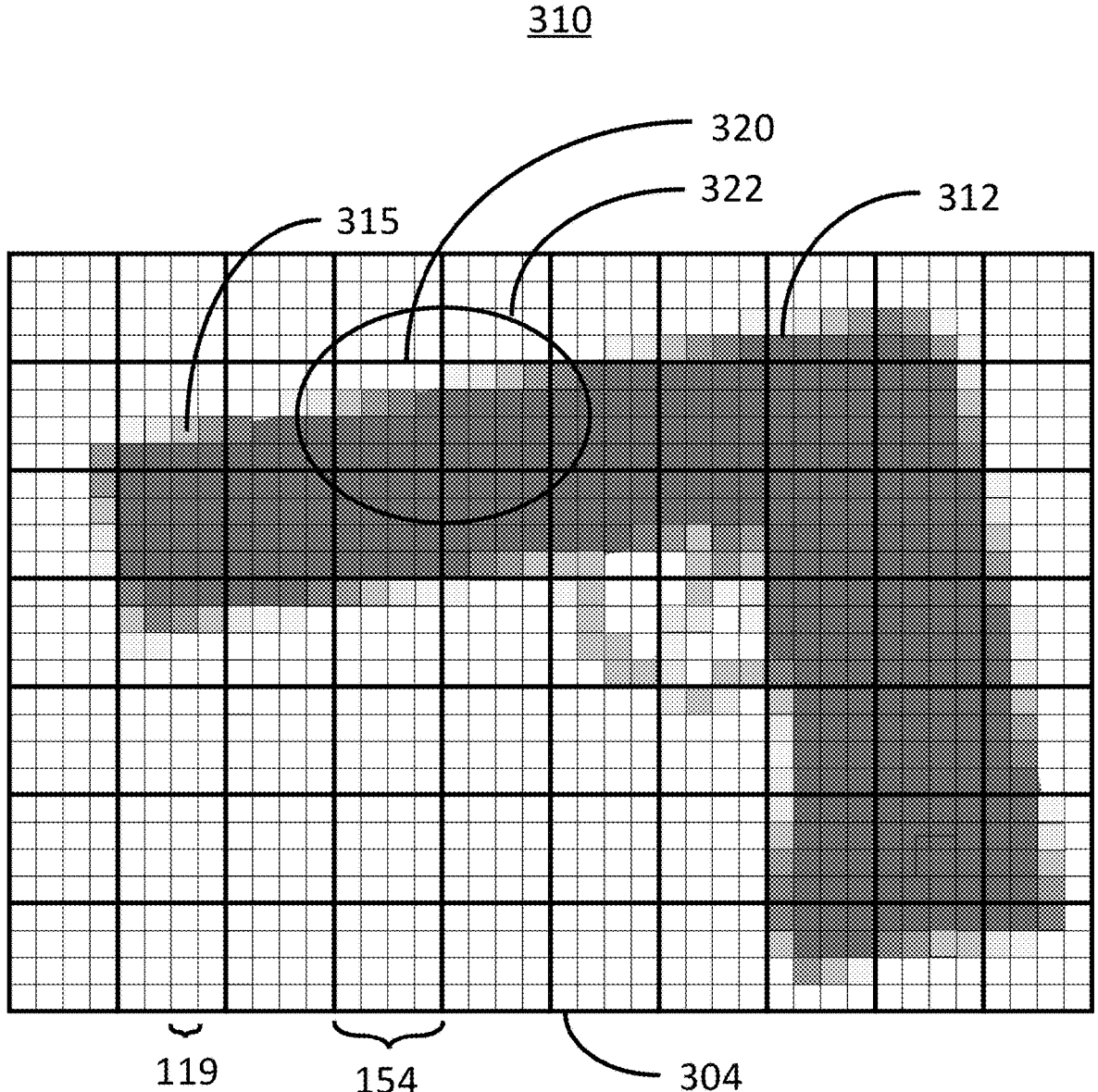

FIGS. 6A-6B illustratively depict a MMW picture of a gun consistent with embodiments of the present invention. The present example is in view of the 16 MMW detector camera array 142 of FIG. 4A. Of course, any number of detectors, from 1 up to many thousands or even millions, can be used. FIG. 6A shows a gun scene 300 within a MMW perimeter 304, which includes a silhouette of a gun 302 mapped against a grid of cells 118 that correspond to the size of MMW contrast cells 119. There are 16 cells 118 in a MMW field-of-view 114 due to the 16 MMW detectors 145 in a camera array 142. The area within the MMW perimeter 304 is defined by the number of MMW fields-of-view 114 in the vertical direction 308 by the number of MMW fields-of-view 114 in the horizontal direction 306. In this example, there are seven MMW fields-of-view 114 in the vertical direction 308 and ten MMW fields-of-view 114 in the horizontal direction 306.

FIG. 6B depicts a MMW picture 310 within the MMW perimeter 304. As depicted, the MMW rendition/image 310 of the MMW gun silhouette 312 is pixilated with each contrast cell 119 having a gray scale value corresponding to the amount of gun silhouette 302 that is in each corresponding cell 118 of FIG. 6A. Hence, the amount of gray scale in any given contrast cell 119 is the average of the amount of gray in its corresponding cell 118. This is shown by the depicted cell 305 of FIG. 6A that is converted to its corresponding contrast cell 315 of FIG. 6B as shown in greater detail in FIG. 6C.

Figure 6C:
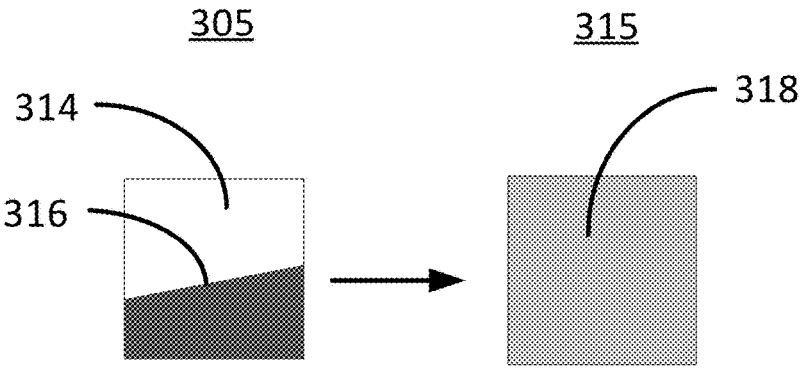
FIG. 6C, in view of FIGS. 6A and 6B, depicts an example of how the contrast from a cell of the gun silhouette is averaged in a MMW contrast cell consistent with embodiments of the present invention.

FIG. 6C, in view of FIGS. 6A and 6B, depicts an example of how the contrast from a cell 118 of the gun silhouette 302 is averaged in a MMW contrast cell 119. Here, the identified cell 305 of FIG. 6A comprises a white background 314 and a dark gray gun segment 316. The corresponding identified MMW contrast cell 315 of FIG. 6B is a digital intensity value representing the average intensity of incoming MMWs 152, which here is a solid pixel of gray 318. The solid pixel of gray 318 is the average of the white background 314 and dark gray gun segment 316. Hence, each MMW contrast cell 319 is an average gray scale of the amount of gun segment 316 and background 314 in the corresponding cell 318. It should be appreciated that each MMW contrast cell 315 is not an image of anything but rather a MMW intensity pixel (the intensity of MMWs 152 detected by a MMW detector 145 converted into a gray scale) having a contrast between white and black (or possibly color in a more advanced system). Hence, the MMW gun picture 310 of the gun 312 is made up of a plurality of pixelated sub-images 154, which correspond to the field's-of-view 114 of FIG. 6A, of parts of the MMW gun rendition 312, which when stitched together form an overall MMW picture 310, or MMW image, of a gun 312.

Figure 6D:
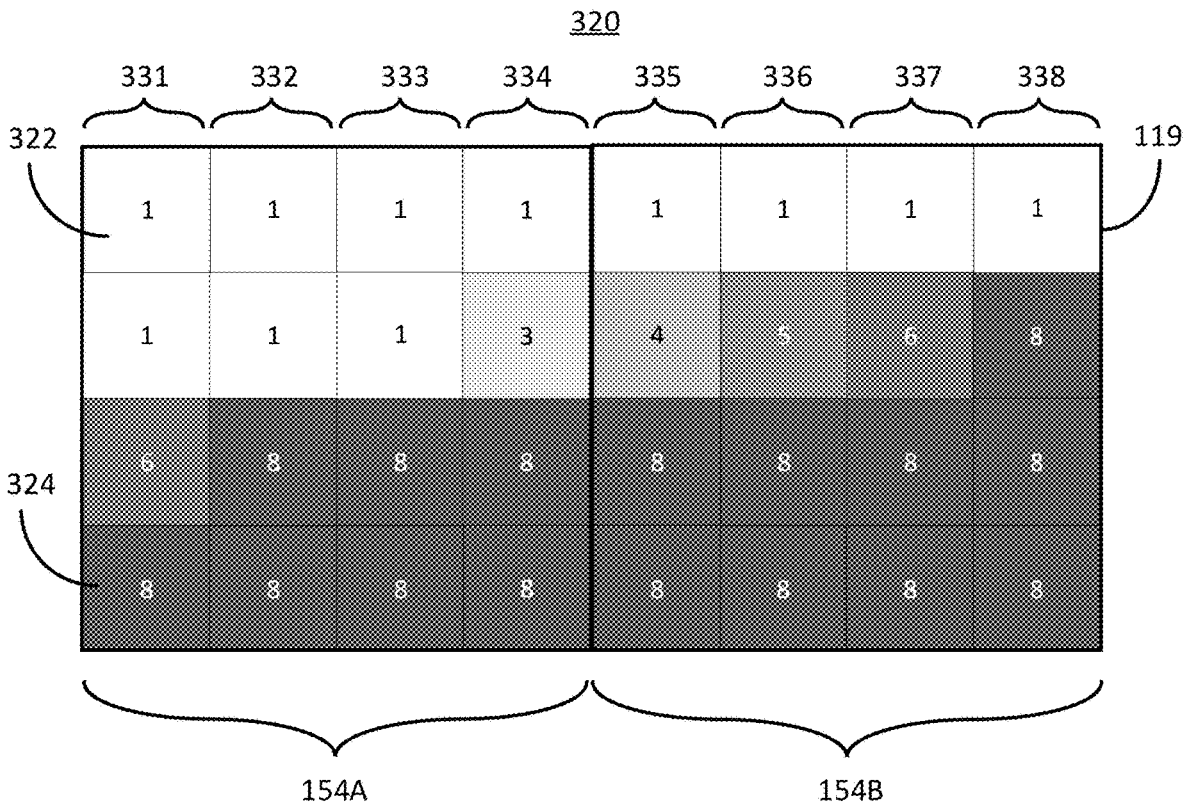
FIGS. 6D-6F are MMW sub-images of a gun portion within the encircled region of FIG. 6B as captured by the MMW camera system consistent with embodiments of the present invention.
Figures 6E, 6F:
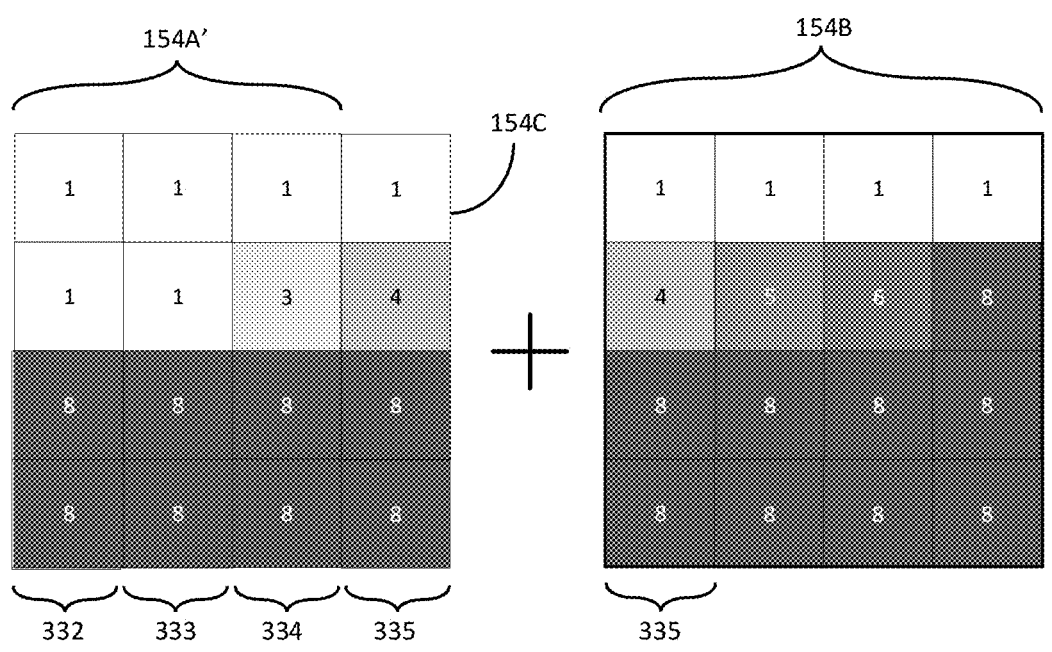

FIGS. 6D-6F are MMW sub-images 154 of a gun portion 320 within the encircled region 322 of FIG. 6B as captured by the MMW camera system 200 consistent with embodiments of the present invention. As shown in FIG. 6D, all the contrast cells 119 are numbered to reflect the level, or degree, of contrast. For example, a white contrast cell 322 representing the background 314 has a contrast value of 1 and a dark gray cell 324 representing the gun 312 has a contrast value of 8. The other contrast cells 119 with values of 3, 4, 5 and 6 are various scales of gray 318 representing different proportions of gun segments 316 to background portions 314. The first sub-image 154A of the gun portion 320 has four columns 331, 332, 333 and 334 each of which possess four MMW contrast cells 119 (of various contrasts). Similarly, the second sub-image 154B of the gun portion 320 has four MMW contrast cells 119 in each of the four columns 335, 336, 337 and 338.

One functional example of the MMW camera system 200 envisions the MMW camera 140, of FIG. 1C, capturing overlapping sub-images 154 as the oscillating mirror 206 (of FIGS. 3C-3J) oscillates and sweeps across a MMW perimeter 112 in a scene 105 (from side to side 242 and up and down 244). In this scenario, overlapping MMW sub-images 154 are stitched together to generate a contiguous MMW picture 150 with minimal to no loss of data due to gaps between adjacent sub-images 154. There is a high likelihood that MMW sub-images 154 that do not overlap will introduce gaps between sub-mages 154A and 154B, for example, thereby lowering the MMW picture resolution or introducing noise thereto.

FIG. 6E depicts two MMW sub-images 154C and 154B that are 87.5% the same as the two MMW sub-images 145A and 154B of FIG. 6D. In this example, the MMW camera 140 first captures the second sub-image 154B and then the third sub-image 154C. The second sub-image 154B of FIGS. 6D and 6E are identical, however, the third sub-image 154C is mostly identical to the first sub-image 154A of the of the gun portion 320 of FIG. 6D but shifted one column to the right. In other words, the third sub-image 154C comprises the far-right column 335, which is the same as the far-left column 335 of the second sub-image 154B. Accordingly, the third sub-image 154C is made up of columns 332, 333, 334 of the first sub-image 154A and column 335 of the second sub-image 154B. The three of the left columns 332, 333 and 334 of the first sub-image 154A are denoted here as 154A' because only part of the first sub-image 154A is captured by the camera 140 to allow for overlapping sub-images 154. When the second sub-image 154B and the third sub-image 154C are connected, or stitched together, a software routine running in the computer system 125 (or some other processor accessing the sub-images 154B and 154C) looks for matching edge patterns to overlap, which in this case are columns 335 in the second sub-image 154B and the third sub-image 154C.

FIG. 6F illustratively depicts the aggregate of the second sub-image 154B and the third sub-image 154C stitched together in a contiguous MMW image 340. More specifically, the MMW image 340 comprises the seven columns 332-338 (instead of the eight columns 331-338 of FIG. 6D) with column 335 overlapped. It should be appreciated that a software routine following the same overlapping logic can be used to stitch together consecutive rows of sub-images 154 to construct a MMW picture 150 in the vertical direction.

Figure 7A:
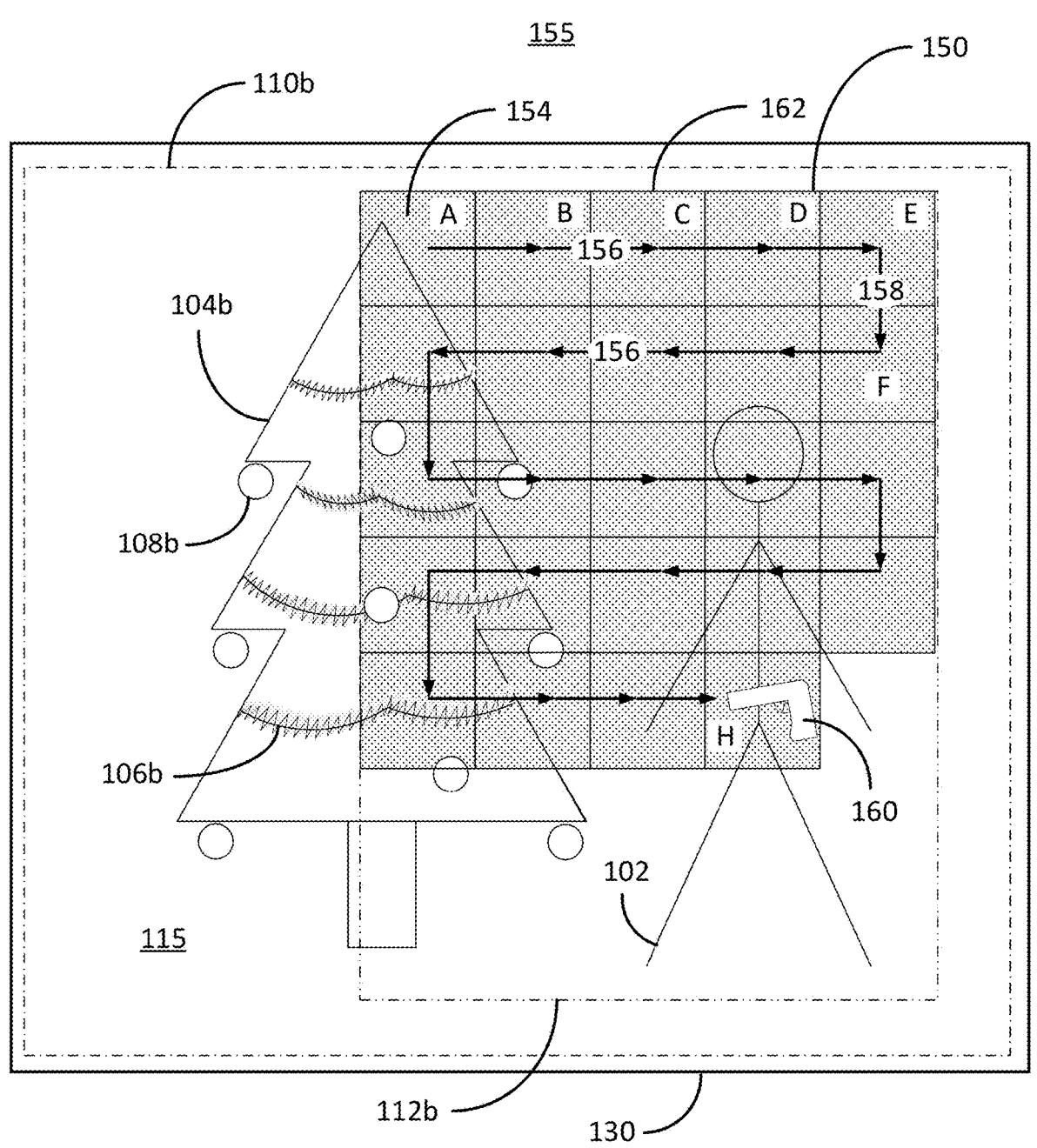
FIGS. 7A-7D illustratively depict methods of stitching together sub-images during the construction of a MMW picture consistent with embodiments of the present invention.

FIGS. 7A-7D illustratively depict methods of stitching together sub-images 154 during the construction of a MMW picture 150. The scene 105 from FIG. 1B is used here by way of example. FIG. 7A depicts a joint overlaid MMW and optical picture 155 with a partial MMW picture 162 (under construction) having 24 sub-images 154 overlaying an optical picture 115. With reference to FIGS. 3G-3H, the oscillating mirror 206 moves along the horizontal direction 156, wherein the left vertex 248 tilts from a lower position 242B to an upper position 242A capturing a plurality of MMW sub-images 154 starting from the left and finishing at the right. In this example, MMW sub-image A is captured first then sub-image B until the left side of the MMW perimeter 112*b* is reached at sub-image E thereby building the first row of MMW sub-images 154. Next, the oscillating mirror 206 is indexed to sweep one MMW field-of-view 114 downward in the vertical direction 158, wherein the upper co-vertex 245 is moved upwards 244A to capture MMW sub-image F, thereby starting a second row of sub-images 154. The second row of sub-images 154 is generated by moving the oscillating mirror 206 in the opposite direction of the first row, wherein the left vertex 248 of the oscillating mirror 206 is tilted 242A from an upper position 242A to a lower position 242B thereby capturing a plurality of MMW sub-images 154 starting from the left and finishing at the right. The last MMW sub-image H is shown to indicate the progressive construction of the partial MMW picture 156. The sub-images 154 are in gray with the metallic objects 106*b*, 108*b* and the gun shaped object 160 in white.

Figure 7B:
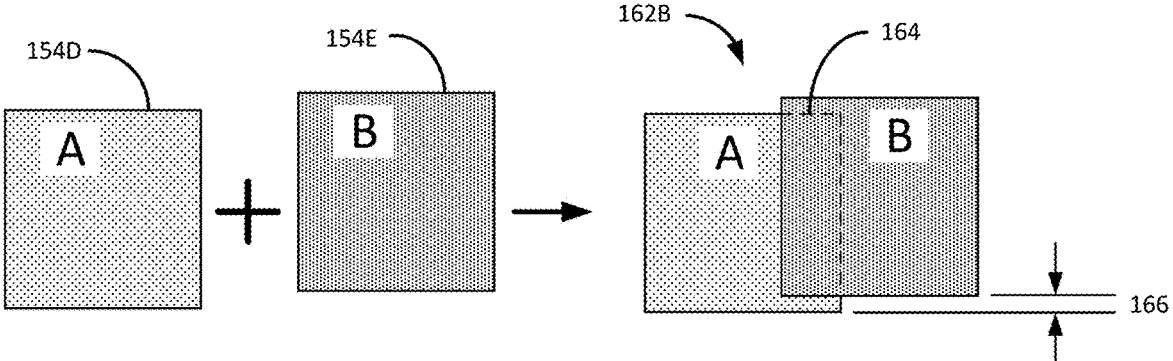
Figure 7C:
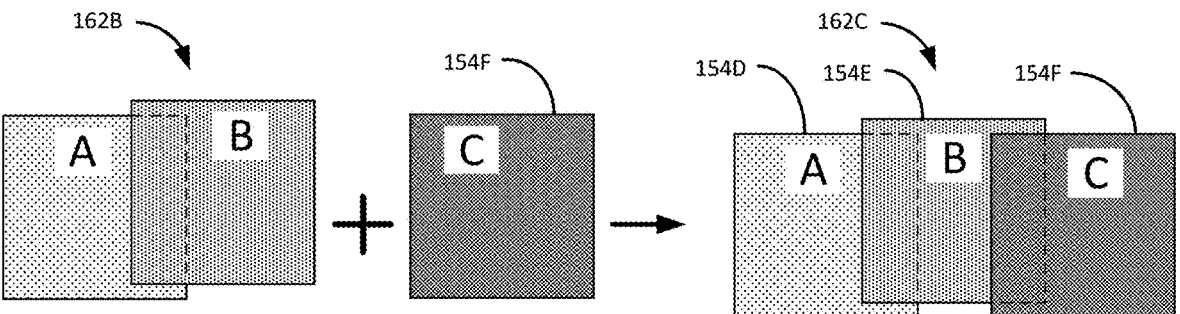
Figure 7D:
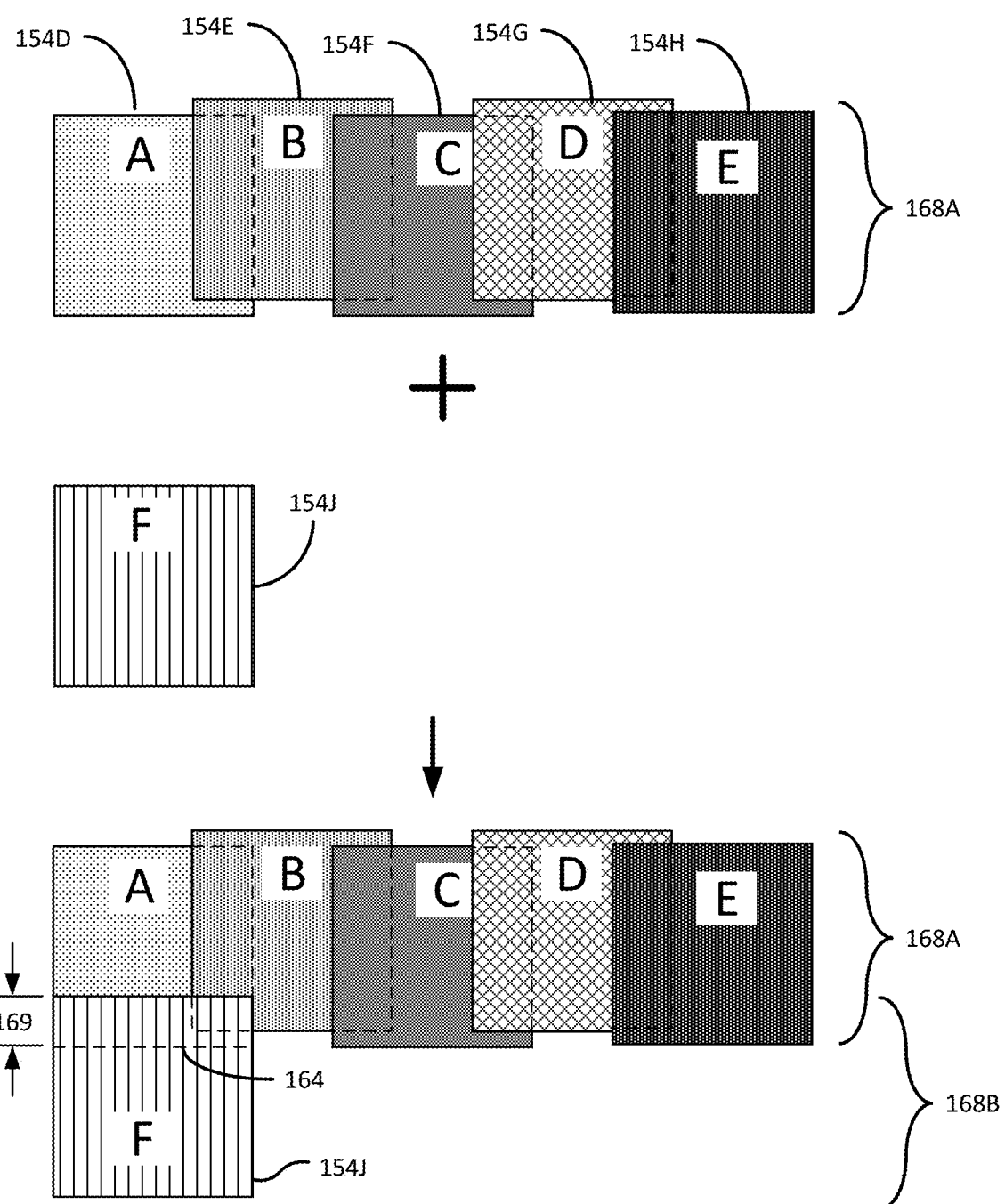

FIGS. 7B-7D illustratively depict a method of stitching together overlapping sub-images 154 during the construction of a MMW picture 150. FIGS. 7B-7D are described in view of FIGS. 6F and 3G-3H. FIG. 7B depicts a second MMW sub-image 'B' 154E overlapping a portion of a first sub-image 'A' 154D. More specifically, the first sub-image 'A' 154D (a light gray) is joined with the second MMW sub-image 'B' 154E (a medium gray). As shown to the right of the arrow, the resultant partial MMW row 162B depicts a dashed outline of the first sub-image 'A' 154D indicating that a portion of the first sub-image 'A' 154D is partially under the second MMW sub-image 'B' 154E, depicted by the hidden (dashed) line 164. There is also an offset 166 between the overlapping sub-images 'A' 154D and 'B' 154E to better illustrate the overlapping relationship. Other embodiments envision no appreciable offset 166 between adjacent MMW sub-images 154 but rather a row MMW sub-images 154 with a uniform edge along the top and bottom.

FIG. 7C illustrates constructing a row of MMW sub-images 154, wherein the partial MMW row 162B is combined with a third MMW sub-image 'C' 154F (a medium-dark gray). The resultant row 162C comprises the first sub-image 'A' 154D joined (or otherwise stitched together) with the second MMW sub-image 'B' 154E joined with the third MMW sub-image 'C' 154F.

FIG. 7D illustratively depicts a first row of MMW sub-images 168A with the construction of a second overlapping row of MMW sub-images 168B. As shown, the first row of MMW sub-images 168A comprises five MMW sub-images 'A'-'E' 154D-154H. The second row of overlapping MMW sub-images 168B is generated when the oscillating mirror 206 is indexed in the vertical direction less than a full MMW field-of-view 114. The result is a MMW sub-image 'F' 154J overlapping sub-image 'A' 154D and a portion of sub-image 'B' 154E with an overlapping segment 169, as shown by the hidden line 164. Sub-image 'F' 154J is the first sub-image 154 of the second row 168B.

Figure 8A:
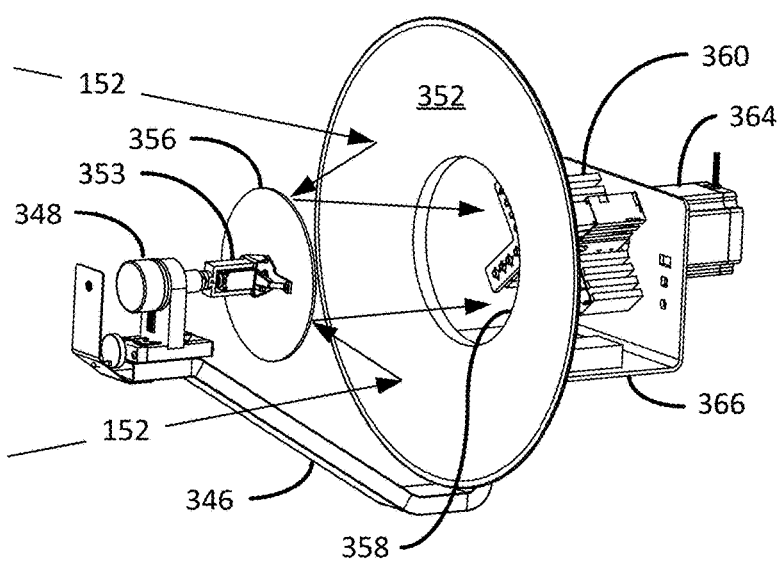
FIGS. 8A-8C are line drawings illustratively depicting another embodiment of a MMW detector arrangement consistent with embodiments of the present invention.
Figure 8B:
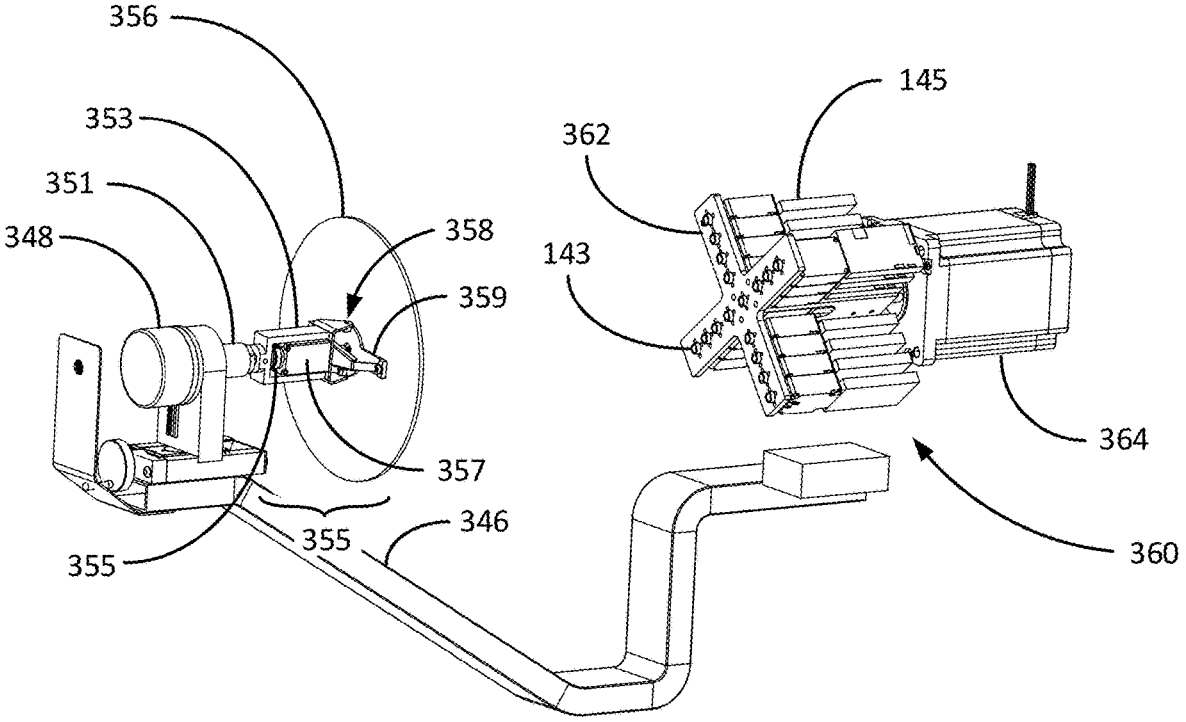
Figure 8C:
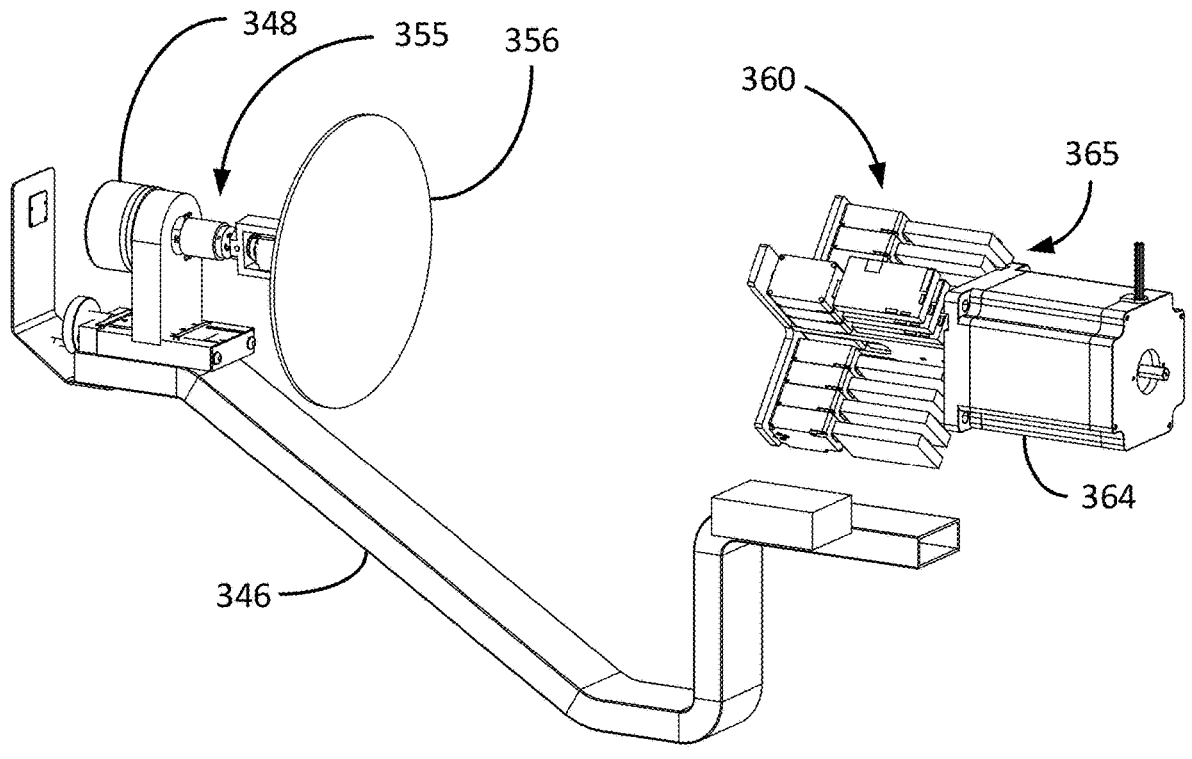

To further appreciate the scope of optional embodiments that fall within the scope and spirit of the present invention, FIGS. 8A-8C are line drawings illustratively depicting yet another embodiment of a MMW detector arrangement consistent with embodiments of the present invention. FIG. 8A is an isometric view of a rotary MMW camera system embodiment 350 without the concentrating mirror 352 to better view the camera and rotating mirror 356. The rotary MMW camera system embodiment 350 generally comprises a concentrating mirror 352, a rotating mirror 356 and a cross-shaped MMW camera 360. The rotating mirror 356 is mounted to a rotating shaft 351 and articulating arm arrangement 355 that generally comprises a box frame 353, an articulating motor 357 and a mirror mounting lever 359 that pivots about the box frame 353 at pivot point 358, as shown in more detail in FIGS. 8B and 8C. The rotating mirror 356 is made to spin via the motor 348 that rotates the rotating shaft 351 and articulating motor arrangement 355. The articulating arm arrangement 355 controls tilting the rotating mirror 356, which causes the mirror 356 to precess while it is spinning thereby changing the angle of the target millimeter waves 152 incident on the MMW camera 360 to build a MMW picture 150 from a plurality of MMW sub-images 154. The articulating motor 357 (which could be a stepper motor) rotates a screw element 355 causing the mirror mounting lever 359 to pivot varying degrees from center about the pivot point 358. This differs from MMW camera system embodiment 200 of FIGS. 2A-2E in that MMW picture 150 that is built is based on circular motion as opposed to a rectangular motion. Hence, in operation, the rotating mirror 356 spins while the articulating arm arrangement 355 progressively tilts the rotating mirror 356 to mesh MMW sub-images 154 in a circular pattern to construct a MMW picture 150. In this embodiment, the cross-shaped MMW camera 360 can further be made to spin or otherwise rotate in a direction opposite the rotating mirror 356 via a motor 364 mounted on the camera back to decrease the time required to progressively acquire MMW sub-images 154 needed to construct the MMW picture 150. An optional embodiment further envisions rotating and precessing the concentrating mirror 352 in addition to the cross-shaped MMW camera 360 and rotating mirror 356, though in this embodiment, the concentrating mirror 352 is held static.

With continued reference to FIG. 8A, MMW waves 152 emitted from a target reflect off the concave concentrating mirror 352 to the rotating mirror 356, which in turn reflects the concentrated MMW waves 152 (off the rotating mirror's reflective surface) through an aperture 358 in the center of the concentrating mirror 352 to the camera 160. In this embodiment, the cross-shaped MMW camera 360 comprises 16 single pixel MMW detectors 145, as depicted by the corresponding MMW radiometric receivers 143. Hence, each single pixel MMW detector 145 detects MMW sub-images 154 in a radius, which obtains different perspectives of the target image (thus filling in the gaps of the MMW picture 150) as the rotating mirror 356 wobbles/precesses during rotation. The MMW camera system embodiment 350 is connected via a support arm 346 and camera frame 366.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention envision a MMW detector arrangement 140 comprising a MMW camera 140 made up of a matrix 142 of single pixel MMW detectors 145 that each comprise a MMW receiving aperture 143, a MMW analog to digital converter 186, and a digital output channel 147, as shown in FIGS. 4A-5B. The MMW receiving aperture 143 is configured to receive MMWs 152 emitted from a target 105, as shown in FIG. 1C. The MMW analog to digital converter 186 is configured to convert the MMWs 152 received from the MMW receiving aperture 143 into a digital intensity value 318. The digital output channel 147 is configured to transmit a digital signal corresponding to the digital intensity value 318, as depicted in FIGS. 6B and 6C. An armature 260 supports and positions the matrix 142 with the MMW receiving apertures 143 of the detectors 145 essentially defining a three-dimensional (3-D) convex curve 268 and 269.

The MMW detector arrangement 140 further envisioning the digital intensity value 318 corresponding to a single visual light spectral contrast cell 119 (see FIG. 6C). The detector arrangement 140 can be further configured to produce a sub-image 154 comprising a plurality of the single visual light spectral contrast cells 119, each of the single visual light spectral contrast cells 119 is generated from a different one of the single pixel MMW detectors 145 (see FIG. 1E). Optionally, the MMW detector arrangement 140 can further comprise non-volatile memory 170 communicatively connected to a microprocessor 172 that is, in turn, communicatively connected to the digital output channels 147. The microprocessor 172 is configured to assemble a MMW sub-image 154 from an array of the single visual light spectral contrast cells 119 (see FIGS. 1F and 6D). The MMW detector arrangement 140 can further comprise a visual screen 130 connected to the microprocessor 172, wherein the visual screen 130 is configured to display a MMW picture 150 comprising a plurality of the sub-images 154 that are contiguously stitched together (see FIGS. 6D-6F).

A further embodiment of the MMW detector arrangement 140 envisions each of the MMW receiving apertures 143 defining a line-of-sight 265 extending along a central axis 149 of each of the MMW receiving apertures 143, wherein the MMW receiving apertures 143 are arranged with the lines-of-sight 265 all angled towards one another (see FIG. 4C). This further envisions the lines-of-sight 265 converging at a focal point 270 (see FIG. 4C).

Certain embodiments of the MMW detector arrangement 140 can further comprising an armature 260 that retains the matrix 142 in place (see FIG. 4A).

Some embodiments of the MMW detector arrangement 140 of claim 1 contemplate the MMW waves 152 that are emitted from a target 105 can comprise reflected radar MMWs 136 (see FIG. 1C). This embodiment is considered an active MMW arrangement 100.

Another embodiment of the MMW detector arrangement 140 imagines the matrix 142 being non expandable, meaning it is fixed and inflexible to adding more of the detectors 145.

Another embodiment of the present invention contemplates a MMW detector system 140 is a MMW camera 140 that comprises a plurality of single pixel MMW detectors 145 arranged in a matrix 142, each of single pixel MMW detectors 145 comprising a MMW receiving aperture 143, a MMW analog to digital converter 186, and a digital output channel 147, as shown in FIGS. 4A-5B. The MMW receiving aperture 143 is configured to receive MMW waves 152, as shown in FIG. 1C. The MMW analog to digital (A to D)

converter 186 is configured to convert the MMW waves 152 that are received from the MMW receiving aperture 143 into a digital intensity value 119 and 318. The digital output channel 147 is configured to transmit a digital signal corresponding to the digital intensity value 119 and 318, as depicted in FIGS. 6B and 6C. The plurality of single pixel MMW detectors 145 are positioned with, or otherwise having, each of the MMW receiving apertures 143 disposed along a three-dimensional (3-D) convex curve 268 and 269.

One embodiment of the MMW detector system 140 envisions the plurality of single pixel MMW detectors 145 being arranged in a matrix 142 (see FIG. 4B). In one optional embodiment, the matrix 142 can consist of 16 of the single pixel detectors 145 arranged in a 4×4 array (see FIG. 4B).

The MMW detector system 140 further envisions each of the MMW receiving apertures 143 having a line-of-sight 265 that converge at a focal point 270 (see FIG. 4C).

The MMW detector system 140 further imagines each of the MMW receiving apertures 143 defining a line-of-sight 265 extending through a central axis 149 of each of the MMW detectors 145, wherein the MMW receiving apertures 143 arranged with the lines-of-sight 265 all being angled towards one another (see FIG. 4C).

The digital intensity value 318 in the MMW detector system 140 can further correspond to a single visual light spectral contrast cell 119 (see FIG. 6C). In addition, the detector system 140 can be configured to produce a sub-image 154 comprising a plurality of the single visual light spectral contrast cells 119, wherein each of the single visual light spectral contrast cells 119 is produced from a different one of the single pixel MMW detectors 145 (see FIG. 1E).

Yet another embodiment of the present invention contemplates a detector device (MMW camera) 140 comprising an array 142 of single pixel MMW receivers 145 each having a MMW receiving aperture 143, a MMW analog to digital converter 186, and a digital output channel 147. Each of the detectors 145 is envisioned to have a line-of-sight 265 extending from each of the MMW receiving apertures 143. The array 142 is arranged wherein the detector lines-of-sight 265 are all angled towards one another. Each of the MMW receiving aperture 143 is configured to receive MMW waves 152. Each of the MMW analog to digital converters 186 is configured to convert the MMW waves 152 received from a corresponding one of the MMW receiving apertures 143 into a digital intensity value 119 and 318. Each of the digital output channels 147 is configured to transmit a digital signal corresponding to the digital intensity value 119 and 318.

Each of the detector lines-of-sight 265 in the detector device 140 are envisioned to converge at a focal point 270 (see FIG. 4C).

The detector device 140 further contemplates the detector device 140 being configured to send the digital intensity values 119 and 318 from each of the single pixel receivers 145 to a display screen 130, wherein the display screen 130 is configured to display the digital intensity values 119 and 318 in a single MMW sub-image 154 in the visual light spectrum (see FIGS. 6B and 6D).

Another embodiment of the present invention contemplates a MMW detector arrangement 200 that comprises an oscillating mirror 206 (as shown in FIGS. 2A-3J) positioned between a MMW camera 140 and a target 105. The MMW camera 140 comprises an array 142 of MMW detectors 145 and is configured to output first MMW sub-image data and second MMW sub-image data, such as along pathway 144 of FIG. 1C.

MMW detector arrangement 200 further comprises a display screen 130 that displays a first MMW sub-image 154A and a second MMW sub-image 154B, wherein the first MMW sub-image 154A corresponds to or is otherwise generated from the first MMW sub-image data and a second MMW sub-image 154B corresponds to or is otherwise generated from the second MMW sub-image data. Each of the sub-images 154A and 154B comprises a plurality of MMW contrast cells 119 each of which correspond to one of the MMW detectors 145 in the array 142, as shown in FIGS. 6A-6D.

The first MMW sub-image 154A corresponds to the oscillating mirror 206 being in a first position, the second MMW sub-image 154B corresponding to the oscillating mirror 206 being in a second position, for example as shown in FIGS. 3I and 3J.

This MMW detector arrangement 200 further envisions the oscillating mirror 206 comprising a reflective surface 209 that defines a horizontal axis 240 and a vertical axis 241 that intersect at a center point 250. For example, as shown in FIG. 3A, a first point 245 and a third point 247 reside along the horizontal axis 240 at a periphery of the oscillating mirror 206, a second point 246 and a fourth point 248 reside along the vertical axis 241 at the periphery of the oscillating mirror 206. The MMW camera 140 is configured to scan the scene 105 horizontally 112 when the second point 246 and the fourth point 248 move in a seesaw motion 242A and 242B about the center point 250, which defines horizontal boundaries of the MMW picture 150, and the MMW camera 140 is configured to scan the scene 105 vertically 112 by sweeping the first point 245 from high to low about the center point 250 while the third point 247 sweeps in a direction opposite the first point 245, which defines vertical boundaries of the MMW picture 150 (see FIGS. 3A and 3B).

The MMW detector arrangement 200 further imagines the horizontal scan of the scene 105 corresponding to a row 168 of MMW sub-images 154 (see FIG. 7D). Moreover, the vertical sweep of the scene 105 can correspond to columns of MMW sub-images 154 (see FIG. 7D). Optionally, the oscillating mirror 206 can be elliptical with vertices at the second point 246 and the fourth point 248 (see FIGS. 3A and 3B). One embodiment contemplates the oscillating mirror 206 having co-vertices at the first point 245 and the third point 247 (see FIGS. 3A and 3B).

This MMW detector arrangement 200 further envisions the oscillating mirror 206 being motorized to move about a mirror center point 250 (see FIG. 2C).

The MMW detector arrangement 200 further contemplates the oscillating mirror 206 being convex (see FIG. 2C).

The MMW detector arrangement can further comprise a receiving mirror 202 and a static reflecting mirror 204, wherein the static reflecting mirror 204 is interposed between the receiving mirror 202 and the oscillating mirror 206 and the receiving mirror 202 is interposed between the static reflecting mirror 204 and the scene 105. The MMWs 152 are configured to reflect off the receiving mirror 202 and a static reflecting mirror 204 before reflecting off the oscillating mirror 206. (see FIG. 2C).

The MMW detector arrangement 200 further imagines at least a portion of the MMWs 152 originating from an active source 135 (see FIG. 1C).

The MMW camera 140 in the MMW detector arrangement 200 is further imagined to be statically mounted to a frame 236 (see FIG. 2A).

Still another embodiment of the present invention contemplates a MMW camera arrangement 200 comprising a repositionable mirror 206, as shown in FIGS. 2A-3J, positioned between a MMW camera 140 and a target 105, as shown in FIG. 1C. The MMW camera 140 is configured to collect MMW waves 152 from the target 105 that are redirected (to the MMW camera 140) via the repositionable mirror 206, as shown in FIG. 2C. The MMW camera arrangement 200 further comprises a display screen 130 comprising or otherwise displaying a MMW picture 150. The MMW picture 150 comprising a first MMW sub-image 154A obtained from the MMW camera 140 while the repositionable mirror 206 was in a first position and a second MMW sub-image 154B obtained from the MMW camera 140 while the repositionable mirror 206 was in a second position, for example as shown in FIGS. 3I and 3J.

This MMW detector arrangement 200 further imagines the first MMW sub-image 154A comprising a plurality of contrast cells 119 each of which corresponds to a MMW detector 145 in the MMW camera 140, wherein the MMW camera 140 comprises an array of the MMW detectors 145 (see FIG. 6C).

This MMW detector arrangement 200 further contemplates the repositionable mirror 206 comprising a gimbal motor 238 that is configured to move the repositionable mirror 206 from the first position to the second position. (see FIG. 2C).

This MMW detector arrangement 200 can further comprise a receiving mirror 202 and a static reflecting mirror 204, wherein the static reflecting mirror 204 is interposed between the receiving mirror 202 and the repositionable mirror 206. The receiving mirror 202 is interposed between the static reflecting mirror 204 and the target 105. The MMWs 152 are configured to reflect off the receiving mirror 202 and a static reflecting mirror 204 before reflecting off the repositionable mirror 206. (see FIG. 2C).

The oscillating mirror 206 in MMW detector arrangement 200 is further imagined to be convex (see FIG. 2C).

The first MMW sub-image 154A and the second MMW sub-image 154B in the MMW detector arrangement 200 can partially overlap. (see FIG. 6D).

While still another embodiment of the present invention contemplates a MMW camera arrangement 200 that generally comprises a MMW camera 140 having a line-of-sight 151 directed at an oscillating mirror 206, as shown in FIGS. 2A-3J, wherein the oscillating mirror 206 is configured to redirect MMWs 152 received from a target to the MMW camera 140. A display screen 130, as shown in FIG. 1C, is configured to display a MMW picture 150, wherein the MMW picture 150 comprises a first MMW sub-image 154A obtained from the MMW camera 140 while the oscillating mirror 206 is in a first position and a second MMW sub-image 154B obtained from the MMW camera 140 while the oscillating mirror 206 is in a second position, for example as shown in FIGS. 3I and 3J.

The MMW detector arrangement 200 further contemplates the first MMW sub-image 154A comprising a plurality of contrast cells 119, each of which corresponds to a MMW detector 145 in the MMW camera 140. The MMW camera 140 comprises an array of the MMW detectors 145 (see FIG. 6C). This can further comprise a receiving mirror 202 and a static reflecting mirror 204, wherein the static reflecting mirror 204 is interposed between the receiving mirror 202 and the oscillating mirror 206, the receiving mirror 202 is interposed between the static reflecting mirror 204 and the target 105 (when present). The MMWs 152 reflect off the receiving mirror 202 and the static reflecting mirror 204 before reflecting off the repositionable mirror 206. (see FIG. 2C).

Other embodiments contemplate a MMW camera arrangement 200 method comprising a step for providing a repositionable mirror 206 positioned between a MMW camera 140 and a target 105. With the repositionable mirror 206 in a first position, a step for deflecting first MMW waves 152 from a first field-of-view 114 of the target 105 to the MMW camera 140. A step for converting the first MMW waves 152 from the first field-of-view 114 into first digital sub-image data of the first field-of-view 114; a display 130 receiving the first digital sub-image data and displaying a first sub-image 154 corresponding to the first digital sub-image data. A step for repositioning the repositionable mirror 206 in a second position. While in the second position, a step for deflecting second MMW waves 152 from a second field-of-view 114 of the target 105 to the MMW camera 140. A step for converting the second MMW waves 152 from the second field-of-view 114 into second digital sub-image data of the second field-of-view 114. And, a step for displaying a second sub-image 154 corresponding to the second digital sub-image data on the display 130.

Still other embodiments of the present invention contemplate a detector arrangement 200 comprising a multi-positional mirror 206 interposed between a statically mounted MMW camera 140 and a target 105, wherein the MMW camera 140 comprises a matrix 142 of single pixel MMW detectors 245 each of which comprise a MMW receiving aperture 143, an analog to digital converter 186, and a digital output channel 147. The matrix 142 is configured to receive MMWs 152 from a target field-of-view 114. The MMWs 152 are reflected off the multi-positional mirror 206. The target field-of-view 114 defined in size by how many of the single pixel MMW detectors 245 comprise the matrix 142. The target field-of-view 114 corresponds to a single MMW sub-image 154 viewable from a display screen 130. A MMW picture 150, viewable from a display screen 130, is comprised of a plurality of the MMW sub-images 154 successively stitched together (meaning that a first MMW sub-image 154A is obtained before a second MMW sub-image 154B, and so forth). Each of the MMW sub-images 154 correspond to a different view of the target 105. Each of the different views correspond to a different position of the multi-positional mirror 206.

The MMW detector arrangement 200 further envisions the multi-positional mirror 206 defining a center point 250, a first point 245 that is 90° from a second point 246 that is 90° from a third point 247 that is 90° from a fourth point 248, all the points 245, 246, 247, 248 and 250 are defined on a reflecting face 209 of the multi-positional mirror 206. The multi-positional mirror 206 is configured to scan the scene 105 horizontally 112 by oscillating the second point 246 and the fourth point 248 in a seesaw motion 242A and 242B about the center point 250, which defines horizontal boundaries of the MMW picture 150. Furthermore, the multi-positional mirror 206 is configured to scan the scene 105 vertically 112 by sweeping the first point 245 from high to low about the center point 250 while the third point 247 sweeps in a direction opposite the first point 245, which defines vertical boundaries of the MMW picture 150 (see FIGS. 3A and 3B). Optionally, the horizontal scan of the scene 105 corresponds to a row 168 of MMW sub-images 154 (see FIG. 7D). In addition, the vertical sweep of the scene 105 corresponds to columns of MMW sub-images 154 (see FIG. 7D).

This MMW detector arrangement 200 further imagines the multi-positional mirror 206 being elliptical with vertices 246 and 248 configured to oscillate about a center point 250, which defines horizontal boundaries of the MMW picture 150 (see FIGS. 3A and 3B).

This MMW detector arrangement 200 further contemplates the multi-positional mirror 206 being elliptical with co-vertices 245 and 247 configured to sweep about a center point 250, which define vertical boundaries of the MMW picture 150 (see FIGS. 3A and 3B).

This MMW detector arrangement 200 further conceives the multi-positional mirror 206 being motorized to move about a mirror center point 250 (see FIG. 2C).

This MMW detector arrangement 200 additionally imagines the multi-positional mirror 206 being convex (see FIG. 2C).

This MMW detector arrangement 200 can further comprise a receiving mirror 202 and a static reflecting mirror 204, wherein the static reflecting mirror 204 is interposed between the receiving mirror 202 and the multi-positional mirror 206. The receiving mirror 202 is interposed between the static reflecting mirror 204 and the scene 105. The MMWs 152 are configured to reflect off the receiving mirror 202 and a static reflecting mirror 204 before reflecting off the multi-positional mirror 206. (see FIG. 2C).

This MMW detector arrangement 200 further contemplates at least a portion of the MMWs 152 originate from an active source 135 (see FIG. 1C).

Other embodiments of the present invention contemplate a MMW display arrangement 100 comprising a MMW camera 140 coupled to (electrically connected to in order to transmit data to) a display screen 130, as shown in FIG. 1C. The MMW camera 140 comprises an array 142 of single pixel MMW detectors, as shown in FIGS. 4A and 4B. The display screen 130 comprises a first MMW sub-image 154A that is joined, or otherwise touching/connected, to a second MMW sub-image 154B, as shown in FIGS. 6A-6D. Each of the MMW sub-images 154A and 154B comprises a plurality of contrast cells 119, each of which are produced from a corresponding one of the single pixel MMW detectors 145. Each of the single pixel MMW detectors 145 is configured to detect MMWs 152 from a different portion of a target 105 and convert the detected MMWs 152 into digital contrast cell data displayed as the contrast cell 119, as shown in FIG. 6B. The first MMW sub-image 154A is obtained before the second MMW sub-image 154B and the first MMW sub-image 154A is from a different part of the target 105 than the second MMW sub-image 154B, as shown in FIG. 6D.

This MMW display arrangement 100 further comprises a computer system 125 with non-volatile memory 170 and overlay software 176 executable via a processor 176, wherein the overlay software 176 is configured to join, or otherwise stitch together, the first MMW sub-image 154A with the second MMW sub-image 154B (see FIGS. 6D and 6E).

This MMW display arrangement 100 further comprises a MMW picture 150 displayed on the display screen 130, wherein the MMW picture 150 comprises a plurality of MMW sub-image rows 168, and wherein the first MMW sub-image 154A and the second MMW sub-image 154B are in one of the rows 168 (see FIG. 7D). This can further be wherein the rows 168 comprise a first row 168A and a second row 168B that partially overlap (see FIG. 7D). Optionally, this can further comprise an optical picture 115 of the target 105 displayed on the display screen 130, wherein the MMW picture 150 is superimposed over the optical picture 115 (see FIG. 1D).

This MMW display arrangement 100 further envisions the first MMW sub-image 154A and the second MMW sub-image 154B partially overlapping (see FIG. 7D). This can further comprise a computer system 125 with non-volatile memory 170 and overlay software 176 executable via a processor 176. The first MMW sub-image 154A comprises a plurality of first edge contrast cells 335 and the second MMW comprises a plurality of second edge contrast cells 335 that are essentially identical to the first edge contrast cells 335. The overlay software is configured to join the first sub-image 154A with the second MMW sub-image 154B by overlaying the first edge contrast cells 335 and the second edge contrast cells 335 (see FIGS. 1F and 7D).

This MMW display arrangement 100 further imagines the first MMW sub-image 154A and the second MMW sub-image 154B being from the different parts of the target 105 by way of a movable mirror 206 positioned at two different angles (see FIGS. 3A-3J).

This MMW display arrangement 100 further contemplates the array 142 is a 4×4 array of single pixel MMW detectors 145 corresponding to a 4×4 matrix of contrast cells 119 in the first MMW sub-image 154A (see FIGS. 4A and 6B).

This MMW display arrangement 100 further envisions the MMW camera 140 being movable via a motor 138 (see FIG. 1C).

Yet another embodiment of the present invention contemplates a MMW capture and display arrangement 100, as shown in FIG. 1C, displayed on a display screen 130 that depicts a first MMW sub-image 154A joined to a second MMW sub-image 154B, as shown in FIGS. 6A-6D. The first MMW sub-image 154A comprises a first matrix of first contrast cells 119 and the second MMW sub-image 154B comprises a second matrix of second contrast cells 119. A MMW camera 140 is connected to the display screen 130, wherein the MMW camera 140 comprising an array 142 of single pixel MMW detectors 145. Each of the single pixel MMW detectors 145 is configured to receive MMWs 152 from a scene 105 and convert the MMWs 152 into contrast cell data corresponding to the contrast cells 119, as shown in FIG. 6D. The first MMW sub-image 154A is from a first portion 114 of the scene 105, which is obtained before the second MMW sub-image 154B, as shown in FIGS. 6A-6D. The second MMW sub-image 154B is from a second portion 114 of the scene 105, as shown in FIG. 6D.

This MMW capture and display arrangement 100 can further comprise a MMW source 135 that when activated, actively produce MMWs 152 that reflect off the scene 105 (see the active MMW arrangement 100 of FIG. 1C).

This MMW capture and display arrangement 100 can further comprise a computer system 125 with non-volatile memory 170 and overlay software 176 that is executable via a processor 176, the overlay software 176 configured to join the first MMW sub-image 154A with the second MMW sub-image 154B (see FIGS. 6D and 6E).

This MMW display arrangement 100 of claim 11 can further comprise a MMW picture 150 that is displayed on the display screen 130, the MMW picture 150 comprises a plurality of MMW sub-image rows 168, wherein the first MMW sub-image 154A and the second MMW sub-image 154B are in one of the rows 168 (see FIG. 7D). This can further be wherein the rows 168 comprise a first row 168A and a second row 168B that partially overlap (see FIG. 7D). The display screen 130 can further comprise an optical picture 115 of the target 105 displayed thereon, wherein the MMW picture 150 is superimposed over the optical picture 115 (see FIG. 1D).

This MMW display arrangement 100 further envisioning the first MMW sub-image 154A and the second MMW sub-image 154B partially overlapping (see FIG. 7D).

Another embodiment of the present invention contemplates a method for stitching together MMW sub-images 154, as shown in FIGS. 7A-7D. The method comprises a step for providing a MMW camera 140 comprising an array 142 of single pixel MMW detectors 145, as shown in FIGS. 4A-4D; a step for receiving first MMWs 152 from a first portion 114A of a scene 105 via the MMW camera 140, as shown in FIG. 1C; a step for converting the first MMWs 152 into a first digital MMW sub-image, wherein the first digital MMW sub-image comprises a plurality of digitized MMW cells 118 each corresponding to one of the single pixel MMW detectors 145, as shown in FIGS. 6A and 6B; a step for transmitting the first digital MMW sub-image to a display screen 130, as shown in FIGS. 1C and 1F; a step for receiving second MMWs 152 from a second portion 114B of a scene 105 via the MMW camera 140 after receiving the first portion 114A, as shown in FIG. 7A; a step for transmitting a second digital MMW sub-image of the second MMWs 152 to the display screen 130; and a step for displaying the first and the second digital MMW sub-images as first and second MMW sub-images 154A and 154B that are joined, the first and second MMW sub-images 154A and 154B comprise a plurality of contrast cells 119 each corresponding to the plurality of digitized MMW cells 118, as shown in FIG. 6D.

This method can further comprise a step for executing overlay software on a computer system 125, the overlay software 176 joining the first MMW sub-image 154A to the second MMW sub-image 154B (see FIGS. 6D and 6E).

This method further envisions some of the plurality of contrast cells 119 from the first MMW sub-image 154A overlapping some of the plurality of contrast cells 119 from the second MMW sub-image 154B during the joining step (see FIGS. 6D and 6E).

Another embodiment of the present invention contemplates a MMW scene defining arrangement 200 generally comprising a MMW camera 140 with an adjustable a receiving mirror 202 connected to a turret 220, as shown in FIGS. 2A-2E. This embodiment envisions an oscillating mirror 206 interposed between a static reflecting mirror 204 and the MMW camera 140. A receiving mirror 202, which is view adjusting and therefore configured to redirect MMWs 152 from a scene 105 to the static reflecting mirror 204. The receiving mirror 202 cooperates (this is, attached either directly via pivot points or via an intermediate element, such as the bar 235) with a frame 232 in a pivoting relationship, wherein the receiving mirror 202 is configured to tilt 212 changing a vertical perspective of the scene 105, as shown in FIG. 2B. The static reflecting mirror 204 is configured to redirect the MMWs 152 from the receiving mirror 202 to the oscillating mirror 206, the oscillating mirror 206 is configured to redirect the MMWs 152 from the redirect the MMWs 152 to the MMW camera 140, as shown in FIG. 2C.

This MMW scene defining arrangement 200 can further comprise a turret 220 linked to the frame 232, wherein the receiving mirror 202 and the frame 232 are rotatable about the turret 220. The turret 220 is configured to reposition the receiving mirror 202 changing a horizontal perspective of the scene 105, as shown in FIGS. 2D-2E. This can further be where the static reflecting mirror 204, the oscillating mirror 206 and the MMW camera 140 do not rotate with the turret 220. In an embodiment shown in FIGS. 2D and 2E, the turret 220 comprises an aperture 224 where the MMWs 152B are redirected from the scene 105 via the receiving mirror 202.

This MMW scene defining arrangement 200 further imagines the receiving mirror 202 comprising a means for rotation that is configured to change a horizontal perspective of the scene 105, as shown in FIGS. 2A-2E.

The MMW scene defining arrangement 200 further contemplates the receiving mirror 202 being configured to tilt 212 about pivot points 234 accompanied with the frame 232, as shown in FIG. 2B.

The MMW scene defining arrangement 200 further envisions the oscillating mirror 206 being configured to oscillate 242 and sweep 244 while the receiving mirror 202 remains stationary, as shown in FIG. 2B. The oscillating mirror 206 can further define a MMW perimeter 112 of a portion of the scene 105 and the receiving mirror 202 can further define a location of the portion of the scene 105, as shown in FIGS. 3A-3J.

The MMW scene defining arrangement 200 further imagines the MMWs 152 being first redirected off the receiving mirror 202 toward the static reflecting mirror 204 at a first angle between 70°-110°, the first redirected MMWs 152B are second redirected off the static reflecting mirror 204 at a second angle less than 90°, the second redirected MMWs 152C are third redirected off the oscillating mirror 206 at a third angle greater than 90°, as shown in FIG. 2C.

Yet another embodiment of the present invention envisions a scene adjustable MMW arrangement 200 that generally comprises a MMW camera 140 with an adjustable a receiving mirror 202 connected to a turret 220, as shown in FIGS. 2A-2E. The MMW camera 140 is configured to detect MMWs 152 indirectly from a portion of a scene 105, as shown in FIG. 1C. The arrangement 200 further includes an oscillating mirror 206 between a static reflecting mirror 204 and the MMW camera 140 and a receiving mirror 202 between the static reflecting mirror 204 and the scene 105, as shown in FIG. 2C. When in a first position, the receiving mirror 202 is configured to redirect the MMWs 152 from a first part of the scene 105 to the static reflecting mirror 204, which is configured to redirect the MMWs 152 to the oscillating mirror 206, which is configured to redirect the MMWs 152 to the MMW camera 140. When in a second position, the receiving mirror 202 is configured to redirect the MMWs 152 from a second part of the scene 105 to the MMW camera 140 via the static reflecting mirror 204 and the oscillating mirror 206, wherein the first part is in a different vertical portion of the scene 105 than the second part, as shown in FIGS. 1C and 7A.

This scene adjustable MMW arrangement 200 is further envisioned to comprise a turret 220 that is linked to the frame 232. The receiving mirror 202 and the frame 232 are rotatable about the turret 220, wherein the turret 220 is configured to reposition the receiving mirror 202 to change a horizontal perspective of the scene 105, as shown in FIGS. 2D-2E. It is further imagined that the static reflecting mirror 204, the oscillating mirror 206 and the MMW camera 140 do not with the turret 220.

This scene adjustable MMW arrangement 200 further imagines the receiving mirror 202 being configured to tilt 212 on the frame 232 via pivot points 234.

This scene adjustable MMW arrangement 200 further contemplates the oscillating mirror 206 defining a MMW perimeter 112 of a portion of the scene 105 and the receiving mirror 202 defining a location of the portion of the scene 105.

Still yet another embodiment envisions a scene adjustable method for a MMW camera 140, wherein the method can comprise a plurality of steps to use the scene adjustable MMW arrangement 200. The method can include a step for providing a scene adjustable MMW arrangement 200 comprising a MMW camera 140, a receiving mirror 202, a static reflecting mirror 204 and an oscillating mirror 206, wherein the mirrors 202, 204 and 206 are between a scene 105 and the MMW camera 140, as shown in FIGS. 2A-2E. The method can further include a step for adjusting the receiving mirror 202 in a first position to redirect MMWs 152 from a first vertical region of the scene 105 to the MMW camera 140 via the static reflecting mirror 204 and the oscillating mirror 206, as shown in FIG. 2C; capturing a first MMW picture 150 of a first MMW perimeter 112A corresponding to the first vertical region, as shown in FIG. 7A; readjusting the receiving mirror 202 in a second position to redirect MMWs 152 from a second vertical region of the scene 105 to the MMW camera 140, which is the nature of tilting the receiving mirror 202; and capturing a second MMW picture 150 of a second MMW perimeter 112B corresponding to the second vertical region.

The method further envisions a step for tilting the receiving mirror 202 from the first position to the second position.

The method further comprising a step for rotating the receiving mirror 202 to a first rotational position to redirect MMWs 152 from a first horizontal region of the scene 105 to the MMW camera 140 via the static reflecting mirror 204 and the oscillating mirror 206; a step for capturing a third MMW picture 150 of a third MMW perimeter 112A corresponding to the first horizontal region; a step for readjusting the receiving mirror 202 in a second rotational position to redirect MMWs 152 from a second horizontal region of the scene 105 to the MMW camera 140; and a step for capturing a fourth MMW picture 150 of a fourth MMW perimeter 112B corresponding to the second horizontal region.

The method further envisions the rotating step being accomplished via a turret 220.

The method further imagining the capturing the first MMW picture 150 is accomplished by stitching together a plurality of MMW sub-images 154 of different locations in the first MMW perimeter 112A obtained by moving the oscillating mirror 206 while the MMW camera 140 and the receiving mirror 202 are retained in a single position, as shown in FIG. 7A.

The method of claim 19, wherein each of the sub-images 154 comprising a plurality of contrast cells 119 each corresponding to a single MMW detector 145, the MMW camera 140 comprising an array of the MMW detectors 145, as shown in FIGS. 1E and 4A.

The above sample embodiments should not be considered limiting to the scope of the invention whatsoever because many more embodiments and variations of embodiments are easily conceived within the teachings, scope and spirit of the instant specification.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though light and active MMW radiation sources are depicted with the camera arrangement 100, they could just as easily be external as can be the display 130. The stitching algorithm can be an evolving AI program to better overlay and accommodate the end-user while maintaining the core functionality, for example. Another example is the computer system 125 or a MMW detector 145, which could include more or less elements to accommodate advancements in the art while still maintaining substantially the same functionality without departing from the scope and spirit of the present invention. Moreover, there could be greater or fewer mirrors in the MMW camera arrangement than those described herein to provide more flexibility or simplicity of the arrangement while staying within the scope and spirit of the present invention. Further, the term "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A millimeter wave (MMW) display arrangement comprising:
    a MMW camera comprising an array of single pixel MMW detectors;
    a display screen comprising a first MMW sub-image that is joined to a second MMW sub-image;
    each of the MMW sub-images comprising a plurality of contrast cells, each of which are produced from a corresponding one of the single pixel MMW detectors, each of the single pixel MMW detectors is configured to detect MMWs from a different portion of a target and convert the detected MMWs into digital contrast cell data displayed as one of the plurality of contrast cells;
    the first MMW sub-image is obtained before the second MMW sub-image,
    the first MMW sub-image is from a different part of the target than the second MMW sub-image.

2. The MMW display arrangement of claim 1 further comprising a computer system with non-volatile memory and overlay software executable via a processor, the overlay software configured to join the first MMW sub-image with the second MMW sub-image.

3. The MMW display arrangement of claim 1 further comprising a MMW picture displayed on the display screen, the MMW picture comprises a plurality of MMW sub-image rows, wherein the first MMW sub-image and the second MMW sub-image are in one of the plurality of MMW sub-image rows.

4. The MMW display arrangement of claim 3, wherein the plurality of MMW sub-image rows comprise a first row and a second row that partially overlap.

5. The MMW display arrangement of claim 3 further comprising an optical picture of the target displayed on the display screen, wherein the MMW picture is superimposed over the optical picture.

6. The MMW display arrangement of claim 1, wherein the first MMW sub-image and the second MMW sub-image partially overlap.

7. The MMW display arrangement of claim 6 further comprising a computer system with non-volatile memory and overlay software executable via a processor,
    the first MMW sub-image comprises a plurality of first edge contrast cells and the second MMW sub-image comprises a plurality of second edge contrast cells that are essentially identical to the first edge contrast cells, the overlay software configured to join the first sub-image with the second MMW sub-image by overlaying the first edge contrast cells and the second edge contrast cells.

8. The MMW display arrangement of claim 1, wherein the first MMW sub-image and the second MMW sub-image are from the different parts of the target by way of a movable mirror positioned at two different angles.

9. The MMW display arrangement of claim 1, wherein the array is a 4×4 array of single pixel MMW detectors corresponding to a 4×4 matrix of contrast cells displayed in the first MMW sub-image.

10. The MMW display arrangement of claim 1, wherein the MMW camera is movable via a motor.

11. A millimeter wave (MMW) MMW capture and display arrangement comprising:
    a display screen depicting a first MMW sub-image that is joined to a second MMW sub-image;
    the first MMW sub-image comprising a first matrix of first contrast cells;
    the second MMW sub-image comprising a second matrix of second contrast cells;
    a MMW camera connected to the display screen,
    the MMW camera comprising an array of single pixel MMW detectors,
    each of the single pixel MMW detectors is configured to receive MMWs from a scene and convert the MMWs into contrast cell data corresponding to the contrast cells,
    the first MMW sub-image is from a first portion of the scene obtained before the second MMW sub-image which is from a second portion of the scene.

12. The MMW capture and display arrangement of claim 11 further comprising a MMW source that when activated actively produce MMWs that reflect off the scene.

13. The MMW capture and display arrangement of claim 11 further comprising a computer system with non-volatile memory and overlay software executable via a processor, the overlay software configured to join the first MMW sub-image with the second MMW sub-image.

14. The MMW display arrangement of claim 11 further comprising a MMW picture displayed on the display screen, the MMW picture comprises a plurality of MMW sub-image rows, wherein the first MMW sub-image and the second MMW sub-image are in one of the plurality of MMW sub-image rows.

15. The MMW display arrangement of claim 14, wherein the plurality of MMW sub-image rows comprise a first row and a second row that partially overlap.

16. The MMW display arrangement of claim 14 further comprising an optical picture of the target displayed on the display screen, wherein the MMW picture is superimposed over the optical picture.

17. The MMW display arrangement of claim 11, wherein the first MMW sub-image and the second MMW sub-image partially overlap.

18. A method for stitching together millimeter wave (MMW) MMW sub-images, the method comprising:
    providing a MMW camera comprising an array of single pixel MMW detectors;
    receiving first MMWs from a first portion of a scene via the MMW camera;
    converting the first MMWs into a first digital MMW sub-image, wherein the first digital MMW sub-image comprises a plurality of digitized MMW cells each corresponding to one of the single pixel MMW detectors;

transmitting the first digital MMW sub-image to a display screen;

receiving second MMWs from a second portion of a scene via the MMW camera after receiving the first portion;

transmitting a second digital MMW sub-image of the second MMWs to the display screen; and displaying the first and the second digital MMW sub-images joined together, the first and second digital MMW sub-images each comprise a plurality of contrast cells each corresponding to the plurality of digitized MMW cells.

19. The method of claim 18 further comprising executing overlay software on a computer system, the overlay software joining the first MMW sub-image to the second MMW sub-image.

20. The method of claim 19 wherein some of the plurality of contrast cells from the first MMW sub-image overlap some of the plurality of contrast cells from the second MMW sub-image during the joining step.

\* \* \* \* \*